US011861068B2

(12) United States Patent
Blachly et al.

(10) Patent No.: US 11,861,068 B2
(45) Date of Patent: Jan. 2, 2024

(54) RADIAL GESTURE NAVIGATION

(71) Applicant: Snap Inc., Santa Monica, CA (US)

(72) Inventors: Ty Blachly, Venice, CA (US); Nathan Kenneth Boyd, Los Angeles, CA (US); Donald Giovannini, Venice, CA (US); Krish Jayaram, Santa Monica, CA (US); Evan Spiegel, Los Angeles, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 211 days.

(21) Appl. No.: 17/412,419

(22) Filed: Aug. 26, 2021

(65) Prior Publication Data

US 2021/0382564 A1    Dec. 9, 2021

Related U.S. Application Data

(63) Continuation of application No. 16/670,222, filed on Oct. 31, 2019, now Pat. No. 11,132,066, which is a
(Continued)

(51) Int. Cl.
 *G06F 3/01* (2006.01)
 *G06F 3/041* (2006.01)

(52) U.S. Cl.
 CPC .............. *G06F 3/017* (2013.01); *G06F 3/041* (2013.01)

(58) Field of Classification Search
 CPC .... G06F 3/017; G06F 3/04883; G06F 3/0487; G06F 3/0488; G06F 3/04886;
(Continued)

(56) References Cited

U.S. PATENT DOCUMENTS 5,689,667 A * 11/1997 Kurtenbach .......... G06F 3/0482
 715/810
5,754,939 A    5/1998 Herz et al.
 (Continued)

FOREIGN PATENT DOCUMENTS

CA      2887596 A1    7/2015
CN    104331246 A    2/2015
 (Continued)

OTHER PUBLICATIONS

U.S. Appl. No. 14/740,843 U.S. Pat. No. 10,503,264, filed Jun. 16, 2015, Radial Gesture Navigation.
(Continued)

*Primary Examiner* — William Lu
(74) *Attorney, Agent, or Firm* — Schwegman Lundberg & Woessner, P.A.

(57) ABSTRACT

Systems and methods for radial gesture navigation are provided. In example embodiments, user input data is received from a user device. The user input data indicates a continuous physical user interaction associated with a display screen of the user device. An initial point and a current point are detected from the user input data. A radius distance for a circle that includes the current point and is centered about the initial point is determined. An action is selected from among multiple actions based on the radius distance being within a particular range among successive ranges along a straight line that starts at the initial point and extends through the circle. Each range among the successive ranges corresponds to a particular action among the multiple actions. The selected action is performed in response to detecting a completion of the continuous physical user interaction.

20 Claims, 20 Drawing Sheets

Related U.S. Application Data continuation of application No. 14/740,843, filed on Jun. 16, 2015, now Pat. No. 10,503,264.

(58) Field of Classification Search
CPC .......... G06F 2203/04808; G06F 3/041; G06F 2203/04806
See application file for complete search history.

(56) References Cited

U.S. PATENT DOCUMENTS

| | | | |
|---|---|---|---|
| 6,038,295 A | 3/2000 | Mattes | |
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,483,057 B2 * | 1/2009 | Grosvenor | G03B 17/00 348/239 |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,676,763 B2 | 3/2010 | Rummel | |
| 7,703,140 B2 | 4/2010 | Nath et al. | |
| 7,912,896 B2 | 3/2011 | Wolovitz et al. | |
| 7,971,156 B2 | 6/2011 | Albertson et al. | |
| 7,996,793 B2 | 8/2011 | Latta et al. | |
| 8,063,929 B2 * | 11/2011 | Kurtz | H04N 7/147 348/14.09 |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,219,930 B2 | 7/2012 | Johns | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,487,938 B2 | 7/2013 | Latta et al. | |
| 8,549,432 B2 | 10/2013 | Warner | |
| 8,570,907 B2 | 10/2013 | Garcia, Jr. et al. | |
| 8,578,295 B2 | 11/2013 | Chmielewski et al. | |
| 8,627,233 B2 | 1/2014 | Cragun et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,756,508 B2 | 6/2014 | Ohki et al. | |
| 8,760,557 B2 | 6/2014 | Rydenhag et al. | |
| 8,856,691 B2 | 10/2014 | Geisner et al. | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,195,368 B2 * | 11/2015 | Kuscher | G06F 3/0482 |
| 9,204,252 B2 | 12/2015 | Root | |
| 9,225,805 B2 | 12/2015 | Kujawa et al. | |
| 9,225,897 B1 | 12/2015 | Sehn et al. | |
| 9,230,160 B1 | 1/2016 | Kanter | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,383,897 B2 | 7/2016 | Cragun et al. | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,436,380 B2 | 9/2016 | Chmielewski et al. | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,591,349 B2 * | 3/2017 | Assayag | H04N 21/41407 |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,740,399 B2 * | 8/2017 | Paek | G06F 3/023 |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 10,055,184 B1 * | 8/2018 | Ferrell | G06F 3/0483 |
| 10,057,542 B2 * | 8/2018 | Segal | H04L 12/1822 |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,503,264 B1 | 12/2019 | Blachly et al. | |
| 10,509,466 B1 | 12/2019 | Miller et al. | |
| 10,514,876 B2 | 12/2019 | Sehn | |
| 10,530,731 B1 | 1/2020 | Wu et al. | |
| 10,579,869 B1 | 3/2020 | Xiong et al. | |
| 10,614,855 B2 | 4/2020 | Huang | |
| 10,748,347 B1 | 8/2020 | Li et al. | |
| 10,782,863 B2 * | 9/2020 | Lee | F24C 7/086 |
| 10,958,608 B1 | 3/2021 | Allen et al. | |
| 10,962,809 B1 | 3/2021 | Castañeda | |
| 10,969,781 B1 * | 4/2021 | Tofte | B64D 47/08 |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,063,898 B1 | 7/2021 | Wu et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,132,066 B1 | 9/2021 | Blachly et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0217106 A1 | 11/2003 | Adar et al. | |

(56) References Cited

U.S. PATENT DOCUMENTS

| | | |
|---|---|---|
| 2004/0203959 A1 | 10/2004 | Coombes |
| 2005/0081164 A1* | 4/2005 | Hama ................. G06F 3/04855 |
| | | 715/830 |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0210958 A1* | 9/2006 | Rimas-Ribikauskas ..................... |
| | | G09B 19/0053 |
| | | 434/362 |
| 2006/0242239 A1 | 10/2006 | Morishima et al. |
| 2006/0270419 A1 | 11/2006 | Crowley et al. |
| 2006/0271691 A1 | 11/2006 | Jacobs et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0012788 A1 | 1/2009 | Gilbert et al. |
| 2009/0042588 A1 | 2/2009 | Lottin et al. |
| 2009/0132453 A1 | 5/2009 | Hangartner et al. |
| 2009/0187860 A1* | 7/2009 | Fleck ................. G06F 3/04847 |
| | | 715/834 |
| 2009/0195518 A1* | 8/2009 | Mattice ................. G06F 3/0488 |
| | | 345/177 |
| 2009/0327963 A1* | 12/2009 | Mouilleseaux ..... G06F 3/04883 |
| | | 715/834 |
| 2010/0082427 A1 | 4/2010 | Burgener et al. |
| 2010/0083190 A1* | 4/2010 | Roberts ............... G06F 3/04886 |
| | | 715/863 |
| 2010/0084513 A1* | 4/2010 | Gariepy ............... G05D 1/0094 |
| | | 244/190 |
| 2010/0088151 A1 | 4/2010 | Kim et al. |
| 2010/0100855 A1 | 4/2010 | Yoo |
| 2010/0131880 A1 | 5/2010 | Lee et al. |
| 2010/0182247 A1* | 7/2010 | Petschnigg ......... G06F 3/041661 |
| | | 345/173 |
| 2010/0185665 A1 | 7/2010 | Horn et al. |
| 2010/0192101 A1* | 7/2010 | Chmielewski ........ G06F 3/0482 |
| | | 715/834 |
| 2010/0192102 A1 | 7/2010 | Chmielewski et al. |
| 2010/0192103 A1 | 7/2010 | Cragun et al. |
| 2010/0251180 A1 | 9/2010 | Cragun et al. |
| 2010/0306669 A1 | 12/2010 | Della Pasqua |
| 2011/0029884 A1 | 2/2011 | Grosz et al. |
| 2011/0066980 A1 | 3/2011 | Chmielewski et al. |
| 2011/0093815 A1 | 4/2011 | Gobeil |
| 2011/0099507 A1 | 4/2011 | Nesladek et al. |
| 2011/0102464 A1* | 5/2011 | Godavari ............... G06F 3/0416 |
| | | 345/650 |
| 2011/0126250 A1 | 5/2011 | Turner |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0301934 A1 | 12/2011 | Tardif |
| 2011/0310041 A1* | 12/2011 | Williams ............ G06F 11/3696 |
| | | 345/173 |
| 2011/0320373 A1 | 12/2011 | Lee et al. |
| 2011/0320571 A1 | 12/2011 | Woo et al. |
| 2012/0011267 A1 | 1/2012 | Ma |
| 2012/0013539 A1 | 1/2012 | Hogan et al. |
| 2012/0028659 A1 | 2/2012 | Whitney et al. |
| 2012/0079386 A1 | 3/2012 | Kim et al. |
| 2012/0092286 A1* | 4/2012 | O'Prey ................. G06F 3/0416 |
| | | 345/174 |
| 2012/0184248 A1 | 7/2012 | Speede |
| 2012/0192093 A1* | 7/2012 | Migos ................. G06F 3/04883 |
| | | 345/173 |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0278762 A1 | 11/2012 | Mouilleseaux et al. |
| 2012/0304080 A1 | 11/2012 | Wormald et al. |
| 2012/0308209 A1 | 12/2012 | Zaletel |
| 2013/0019173 A1* | 1/2013 | Kotler ................. G06F 3/04883 |
| | | 715/834 |
| 2013/0027502 A1* | 1/2013 | Skramstad ............... H04N 7/15 |
| | | 348/E7.078 |
| 2013/0063380 A1* | 3/2013 | Wang ................. G06F 3/04883 |
| | | 345/173 |
| 2013/0071093 A1 | 3/2013 | Hanks et al. |
| 2013/0096575 A1 | 4/2013 | Olson |
| 2013/0121481 A1 | 5/2013 | Mikan et al. |
| 2013/0194301 A1 | 8/2013 | Robbins et al. |
| 2013/0268848 A1* | 10/2013 | Pena .................... G06Q 10/109 |
| | | 715/255 |
| 2013/0271618 A1 | 10/2013 | Koryakovskiy et al. |
| 2013/0290443 A1 | 10/2013 | Collins et al. |
| 2013/0311916 A1 | 11/2013 | Weng et al. |
| 2014/0032682 A1 | 1/2014 | Prado et al. |
| 2014/0071063 A1 | 3/2014 | Kuscher et al. |
| 2014/0075388 A1 | 3/2014 | Kuscher et al. |
| 2014/0081620 A1 | 3/2014 | Solntseva |
| 2014/0092100 A1 | 4/2014 | Chen |
| 2014/0109004 A1* | 4/2014 | Sadhvani ............ G06F 3/04883 |
| | | 715/810 |
| 2014/0122787 A1 | 5/2014 | Shalvi et al. |
| 2014/0137042 A1* | 5/2014 | Du ...................... G06F 3/04886 |
| | | 715/834 |
| 2014/0149916 A1 | 5/2014 | Manoff et al. |
| 2014/0157210 A1* | 6/2014 | Katz .................... G06F 1/1694 |
| | | 715/863 |
| 2014/0160054 A1 | 6/2014 | Rabii et al. |
| 2014/0171036 A1 | 6/2014 | Simmons |
| 2014/0201527 A1 | 7/2014 | Krivorot |
| 2014/0204247 A1 | 7/2014 | Bilgen et al. |
| 2014/0282096 A1 | 9/2014 | Rubinstein et al. |
| 2014/0282161 A1* | 9/2014 | Cash ...................... G06F 3/017 |
| | | 715/769 |
| 2014/0298266 A1* | 10/2014 | Lapp ................... G06F 3/04886 |
| | | 715/835 |
| 2014/0325383 A1 | 10/2014 | Brown et al. |
| 2014/0351732 A1* | 11/2014 | Nasraoui ............... G06F 3/0482 |
| | | 715/771 |
| 2014/0359024 A1 | 12/2014 | Spiegel |
| 2014/0359032 A1 | 12/2014 | Spiegel et al. |
| 2014/0375834 A1 | 12/2014 | Lohan et al. |
| 2015/0033143 A1 | 1/2015 | Lee |
| 2015/0046876 A1 | 2/2015 | Goldenberg |
| 2015/0077502 A1* | 3/2015 | Jordan .................... G06Q 10/10 |
| | | 348/14.03 |
| 2015/0082230 A1* | 3/2015 | Lee ....................... G06F 3/0482 |
| | | 715/781 |
| 2015/0113483 A1* | 4/2015 | Van Der Westhuizen ................. |
| | | G06F 3/04815 |
| | | 715/850 |
| 2015/0120293 A1 | 4/2015 | Wohlert et al. |
| 2015/0199082 A1 | 7/2015 | Scholler et al. |
| 2015/0227602 A1 | 8/2015 | Ramu et al. |
| 2015/0271395 A1* | 9/2015 | Taylor ................... H04N 23/63 |
| | | 348/207.1 |
| 2015/0312400 A1* | 10/2015 | Hansen .................. G06V 20/63 |
| | | 455/414.1 |
| 2015/0334142 A1* | 11/2015 | Gottlieb ........... H04N 21/47205 |
| | | 715/753 |
| 2015/0338888 A1 | 11/2015 | Kim et al. |
| 2015/0341903 A1 | 11/2015 | Jeong et al. |
| 2015/0358584 A1* | 12/2015 | Mattson ............... G06Q 10/101 |
| | | 348/14.08 |
| 2015/0370320 A1 | 12/2015 | Connor |
| 2016/0077734 A1* | 3/2016 | Buxton ................. G06F 3/04842 |
| | | 715/773 |
| 2016/0085773 A1 | 3/2016 | Chang et al. |
| 2016/0085863 A1 | 3/2016 | Allen et al. |

(56) References Cited

U.S. PATENT DOCUMENTS

| | | | |
|---|---|---|---|
| 2016/0086670 A1 | 3/2016 | Gross et al. | |
| 2016/0099901 A1 | 4/2016 | Allen et al. | |
| 2016/0127534 A1 | 5/2016 | Celik et al. | |
| 2016/0147433 A1* | 5/2016 | Lin | G06F 11/3096 715/834 |
| 2016/0180887 A1 | 6/2016 | Sehn | |
| 2016/0188191 A1* | 6/2016 | Renard | G06F 3/04845 715/773 |
| 2016/0277419 A1 | 9/2016 | Allen et al. | |
| 2016/0277802 A1* | 9/2016 | Bernstein | H04N 21/44213 |
| 2016/0283106 A1* | 9/2016 | Thorne | H04N 23/66 |
| 2016/0321708 A1 | 11/2016 | Sehn | |
| 2016/0359957 A1 | 12/2016 | Laliberte | |
| 2016/0359987 A1 | 12/2016 | Laliberte | |
| 2017/0123487 A1 | 5/2017 | Hazra et al. | |
| 2017/0161382 A1 | 6/2017 | Ouimet et al. | |
| 2017/0163929 A1* | 6/2017 | Maliuk | H04N 23/635 |
| 2017/0256288 A1* | 9/2017 | Ai | H04N 5/2628 |
| 2017/0263029 A1 | 9/2017 | Yan et al. | |
| 2017/0277684 A1 | 9/2017 | Dharmarajan Mary | |
| 2017/0277685 A1 | 9/2017 | Takumi | |
| 2017/0287006 A1 | 10/2017 | Azmoodeh et al. | |
| 2017/0295250 A1 | 10/2017 | Samaranayake et al. | |
| 2017/0344253 A1 | 11/2017 | Zhang | |
| 2017/0351910 A1 | 12/2017 | Elwazer et al. | |
| 2017/0374003 A1 | 12/2017 | Allen et al. | |
| 2017/0374508 A1 | 12/2017 | Davis et al. | |
| 2018/0032224 A1* | 2/2018 | Cornell | H04N 21/4316 |
| 2018/0091728 A1* | 3/2018 | Brown | G11B 27/34 |
| 2018/0158370 A1 | 6/2018 | Pryor | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0397000 A1 | 12/2021 | Rodriguez, II | |
| 2021/0405761 A1 | 12/2021 | Canberk | |
| 2022/0038414 A1 | 2/2022 | Wu et al. | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0326781 A1 | 10/2022 | Iwang et al. | |
| 2022/0334649 A1 | 10/2022 | Hwang et al. | |

FOREIGN PATENT DOCUMENTS

| | | |
|---|---|---|
| CN | 103049761 | 8/2016 |
| EP | 3707693 | 9/2020 |
| KR | 20220158824 | 12/2022 |
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | 2016168591 | 10/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

U.S. Appl. No. 16/670,222, filed Oct. 31, 2019, Radial Gesture Navigation.

U.S. Appl. No. 15/470,624 U.S. Pat. No. 10,530,731, filed Mar. 27, 2017, Systems and Methods for Chat with Audio and Video Elements.

U.S. Appl. No. 16/698,713 U.S. Pat. No. 11,063,898, filed Nov. 27, 2019, Systems and Methods for Chat with Audio and Video Elements.

U.S. Appl. No. 17/371,541, filed Jul. 9, 2021, Systems and Methods for Chat with Audio and Video Elements.

"U.S. Appl. No. 14/740,843, Advisory Action dated Oct. 11, 2018", 5 pgs.

"U.S. Appl. No. 14/740,843, Final Office Action dated Apr. 7, 2017", 15 pgs.

"U.S. Appl. No. 14/740,843, Final Office Action dated Jun. 10, 2019", 22 pgs.

"U.S. Appl. No. 14/740,843, Final Office Action dated Jul. 19, 2018", 18 pgs.

"U.S. Appl. No. 14/740,843, Non Final Office Action dated Feb. 26, 2019", 18 pgs.

"U.S. Appl. No. 14/740,843, Non Final Office Action dated Oct. 24, 2016", 14 pgs.

"U.S. Appl. No. 14/740,843, Non Final Office Action dated Nov. 30, 2017", 16 pgs.

"U.S. Appl. No. 14/740,843, Notice of Allowance dated Jul. 31, 2019", 8 pgs.

"U.S. Appl. No. 14/740,843, Response filed Feb. 24, 2017 to Non Final Office Action dated Oct. 24, 2016", 11 pgs.

"U.S. Appl. No. 14/740,843, Response filed Mar. 28, 2018 to Non Final Office Action dated Nov. 30, 2017", 10 pgs.

"U.S. Appl. No. 14/740,843, Response filed Jul. 7, 2017 to Final Office Action dated Apr. 7, 2017", 19 pgs.

"U.S. Appl. No. 14/740,843, Response filed Sep. 19, 2018 to Final Office Action dated Jul. 19, 2018".

"U.S. Appl. No. 14/740,843, Response filed Nov. 19, 2018 to Advisory Action dated Oct. 11, 2018", 12 pgs.

"U.S. Appl. No. 14/740,843, Response filed May 7, 2019 to Non Final Office Action dated Feb. 26, 2019", 11 pgs.

"U.S. Appl. No. 15/470,624, Corrected Notice of Allowability dated Nov. 21, 2019", 2 pgs.

"U.S. Appl. No. 15/470,624, Non Final Office Action dated Mar. 21, 2019", 11 pgs.

"U.S. Appl. No. 15/470,624, Notice of Allowance dated Aug. 22, 2019", 7 pgs.

"U.S. Appl. No. 15/470,624, Response filed Jul. 22, 2019 to Non-Final Office Action dated Mar. 21, 2019", 14 pgs.

"U.S. Appl. No. 16/670,222, Non Final Office Action dated Dec. 22, 2020", 10 pgs.

"U.S. Appl. No. 16/670,222, Notice of Allowance dated May 27, 2021", 7 pgs.

"U.S. Appl. No. 16/670,222, Response filed Mar. 18, 2021 to Non Final Office Action dated Dec. 22, 2020", 10 pgs.

"U.S. Appl. No. 16/698,713, Non Final Office Action dated Dec. 22, 2020", 13 pgs.

"U.S. Appl. No. 16/698,713, Notice of Allowance dated Mar. 9, 2021", 7 pgs.

"U.S. Appl. No. 16/698,713, Response filed Feb. 15, 2021 to Non Final Office Action dated Dec. 22, 2020", 12 pgs.

"MCSwipe Table ViewCell", GitHub Inc., [Online]. Retrieved from the Internet: <URL: https://github.com/alikaragoz/MCSwipeTableViewCell/, (2015), 5 pgs.

Castelluccia, Claude, et al., "EphPub: Toward robust Ephemeral Publishing", 19th IEEE International Conference on Network Protocols (ICNP), (Oct. 17, 2011), 18 pgs.

(56) References Cited

OTHER PUBLICATIONS

Fajman, "An Extensible Message Format for Message Disposition Notifications", Request for Comments: 2298, National Institutes of Health, (Mar. 1998), 28 pgs.

Gallagher, Fergal, "Meerkat App That Allows You To Post Live Streaming Video To Twitter Goes Viral", Tech Times, [Online]. Retrieved from the Internet: <URL: http://www.techtimes.com/articles/37029/20150303/meerkat-video-streaming-app-explodes-onto-iphones.htm, (Mar. 3, 2015), 4 pgs.

Jasper, Brad, "Recreating the Radial Menu from iMessages in iOS 8", [Online]. Retrieved from the Internet: <URL: bradjasper.com/blog/radialmenu-imessage-ios8/, (2014), 3 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Strange, Andario, "Want to save Meerkat videos to YouTube? Katch's hashtag wants to help", Mashable, [Online]. Retrieved from the Internet: <URL: http://mashable.com/2015/03/22/katch-for-meerkat/, (Mar. 22, 2015), 12 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"U.S. Appl. No. 17/371,541, Preliminary Amendment filed Sep. 20, 2022", 7 pgs.

"U.S. Appl. No. 16/698,713, Corrected Notice of Allowability dated Jun. 18, 2021", 2 pgs.

* cited by examiner

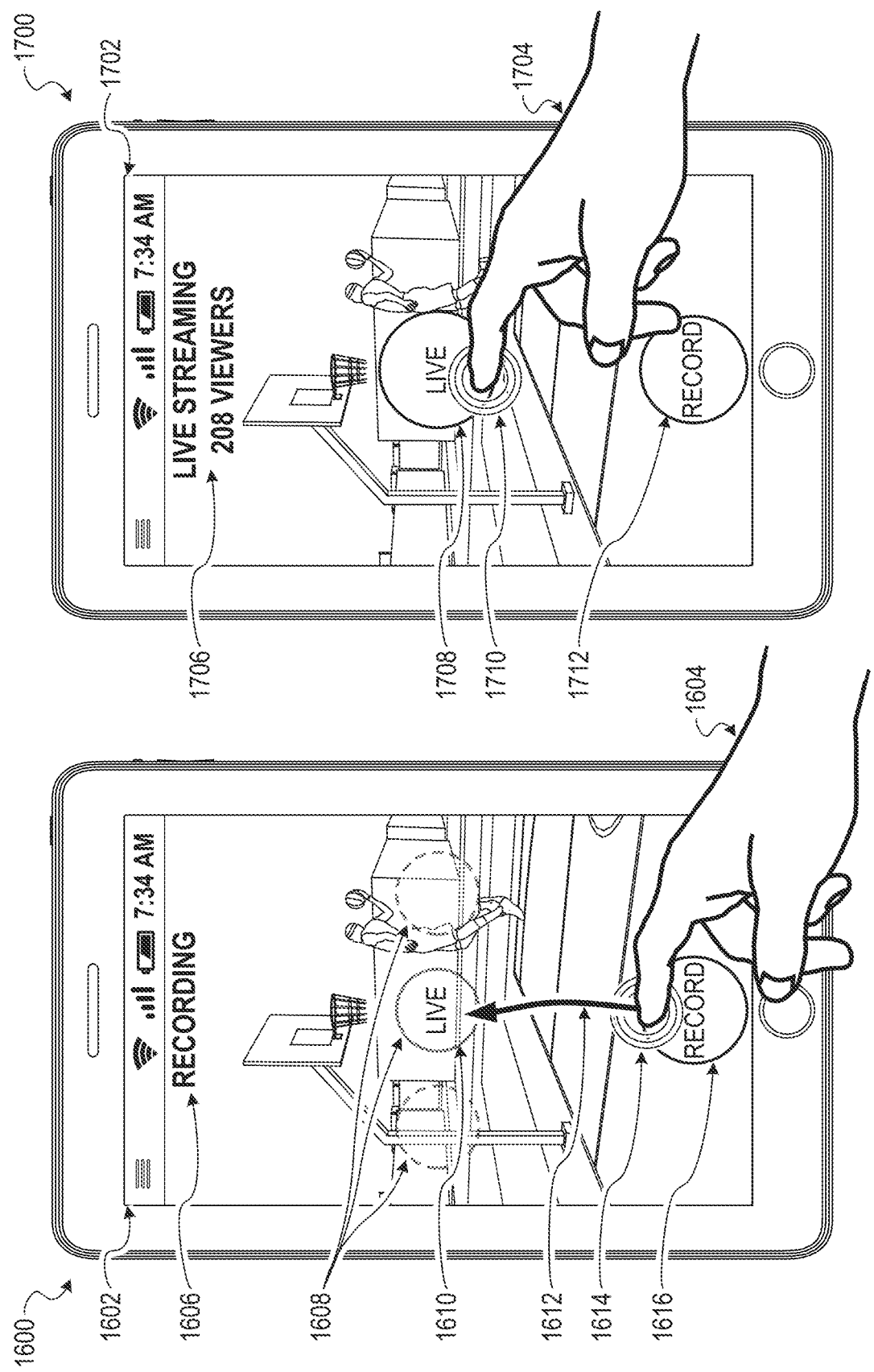

RADIAL GESTURE NAVIGATION

PRIORITY CLAIM

This application is a continuation of and claims the benefit of priority of U.S. patent application Ser. No. 16/670,222, filed on Oct. 31, 2019, which is a continuation of and claims the benefit of priority of U.S. patent application Ser. No. 14/740,843, filed on Jun. 16, 2015, which are hereby incorporated by reference herein in their entireties.

TECHNICAL FIELD

Embodiments of the present disclosure relate generally to user input navigation and, more particularly, but not by way of limitation, to radial gesture navigation.

BACKGROUND

Touchscreen displays and similar point-based input schemes are a popular means of receiving user input amongst mobile devices, wearable devices, and the like. Such user input schemes typically rely upon a user visually identifying and interpreting a particular user interface element in conjunction with manipulating the user interface element to provide input. For instance, a conventional user interface design for a touchscreen may include multiple interactive buttons, where each button performs an action when activated by the user. Over time, a user can become efficient at using a particular user interface design via motor learning resulting from repeated practice with the particular user interface design, provided the user interface design does not change. However, these types of user interface designs are susceptible to drawbacks such as a large display footprint for user interface elements and a diminished ability for the user to become efficient through motor learning when there are changes in, or variations of, the user interface design.

BRIEF DESCRIPTION OF THE DRAWINGS

Various ones of the appended drawings merely illustrate example embodiments of the present disclosure and should not be considered as limiting its scope.

FIG. 16 is a user interface diagram depicting an example of initiating a recording session with an option to switch to live streaming session, according to some example embodiments.

FIG. 17 is a user interface diagram depicting an example of switching from a recording session to a live streaming session, according to some example embodiments.

DETAILED DESCRIPTION

Figure 1:
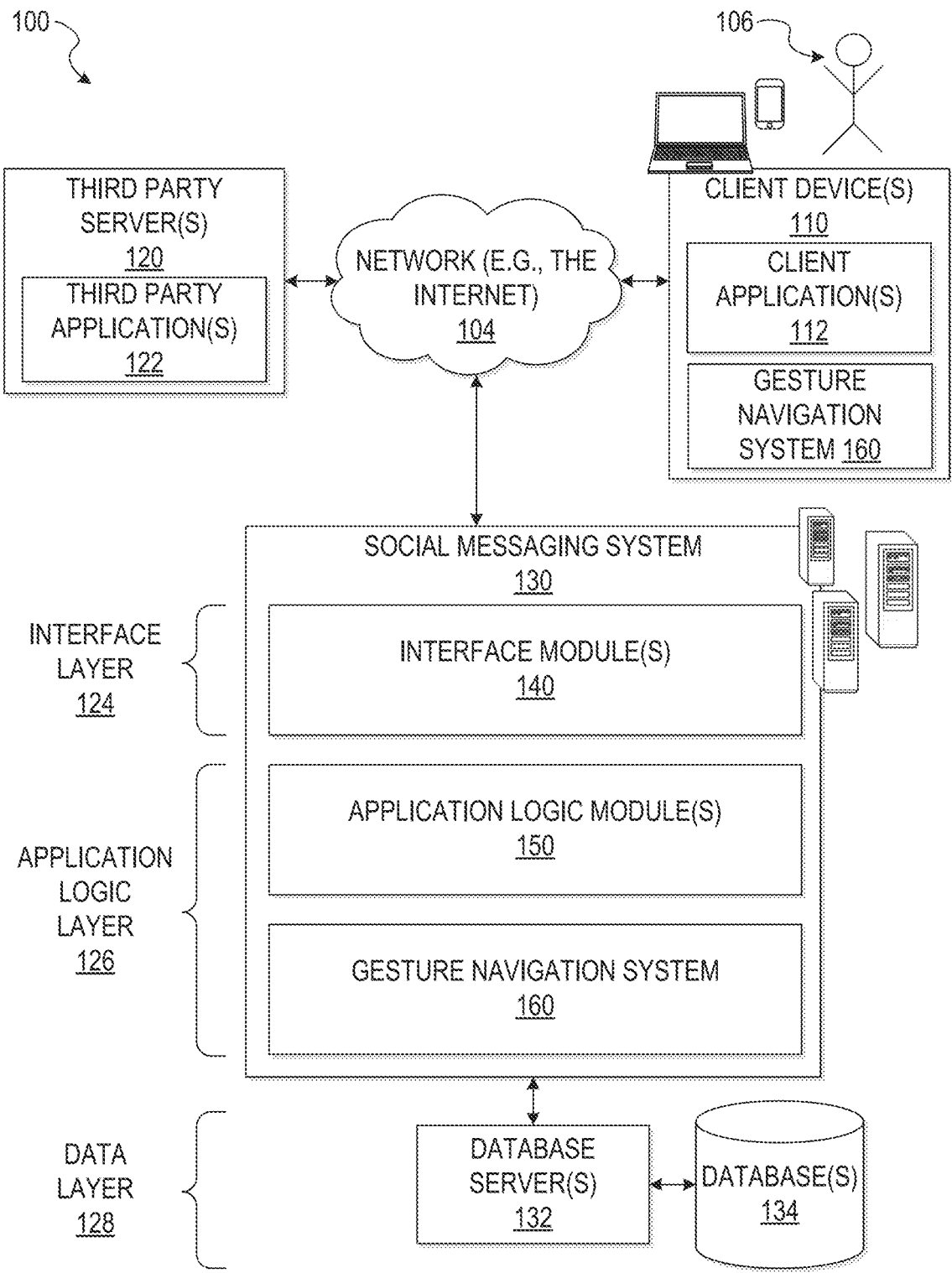
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Many computing devices, such as mobile devices and wearable devices, employ a point-based user input scheme as a primary means of receiving user input. For example, smart phones often include a touch-sensitive display that can receive point-based touch input from a user. These touch-sensitive displays or touchscreens detect user input data resulting from physical contact with the display such as contact from a user's finger, a stylus, or a pen. The user input data can include positional data, force data (e.g., force of a touch on the touchscreen), temporal data (e.g., timing of touchscreen touches or events), and other data. Other input schemes include the use of motion capture to track positional information, such as a motion of a user's hand, fingers, or a stylus in two or three dimensions.

Conventional user interface designs employ visual user interface elements positioned on the display that the user visually identifies and manipulates. Over time, users become adept at interacting with these user interfaces through repeated practice. One drawback to this type of approach is that a change in layout or positioning of an interactive user interface element reduces user efficiency as a user relearns how to interact with the new design. Another drawback to this type of approach is that providing more functionality uses more display spaces (e.g., more buttons to perform more functions). Designers of these conventional user interfaces often face a trade-off between a spacious, easy-to-use design and providing robust functionality with many user interface elements.

In various example embodiments, a radial slide gesture provides an intuitive, space-efficient technique for receiving and interpreting user input. In an example embodiment, a gesture navigation system receives user input data that indicates a continuous physical user interaction (herein, also referred to as a gesture) associated with a display screen of a user device. For instance, the user device may be a smart phone that includes a touchscreen display to track, monitor, or otherwise capture touch data from user input. The gesture navigation system detects an initial point from the user input data such as when the user begins a particular gesture. Subsequently, the gesture navigation system detects a current point from the user input data. The gesture navigation system then determines a radius distance based on the initial point and the current point. For instance, the radius distance is determined from a circle that includes the current point and is centered about the initial point. The gesture navigation system selects an action based on the radius distance. For example, if the radius distance falls within a particular range, the gesture navigation system selects an action corresponding to the particular range. Once the gesture navigation system selects the action, the gesture navigation system performs or invokes the selected action upon termination of the gesture (e.g., the user lifting their finger from the touchscreen display to indicate completion or end of the gesture).

In some embodiments, the gesture navigation system presents a visual indication of an available action as the current point of the gesture transgresses a boundary of a particular range for the available action. For example, the visual indication can include a description of the action that is available to perform (e.g., a textual or graphical description).

In further example embodiments, the gesture navigation system detects an initiation of the radial slide gesture based on a press and hold gesture. For example, the user may touch the touchscreen of the user device and substantially refrain from moving the current point of the touch for a threshold period of time to initiate the radial slide gesture. After the gesture navigation system detects the press and hold gesture, the gesture navigation system can detect the user performing the radial slide gesture to select a particular action among multiple actions. In this way, the radial slide gesture is first affirmatively initiated by the user to prevent an undesired or accidental selection of an action via the radial slide gesture. In certain embodiments, a portion of the user interface is deactivated after the radial slide gesture is initiated to prevent user interface interactions other than the radial slide gesture.

In still further embodiments, the gesture navigation system receives an indication of a designated user interface element and the gesture navigation system performs the selected action in association with the designated user interface element. For instance, the designated user interface element may be an indication of a particular individual on a friends list. In this instance, the selected action may be to send a message or initiate a chat session with the particular individual. In some embodiments, the gesture navigation system determines the designated user interface element based on the initial point. In this way, the radial slide gesture can be used to provide multiple actions for a user interface element located anywhere on the display.

Accordingly, techniques described herein allow for a multiple-action user input that is intuitive and provides interface design freedom since any location on the display can be designated for one or more actions. These techniques are motor skill driven and demand less reliance on the user visually interpreting a user interface. As a result, efficiencies developed by the user can more easily be retained since the radial slide gesture operates similarly across different display layouts. Thus, the radial slide gesture improves user experience by providing a multitude of actions while being intuitive and predictable, even for unfamiliar user interface layouts.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, comprising an interface layer 124, an application logic layer 126, and a data layer 128. As is understood by skilled artisans in the relevant computer and Internet-related arts, each module, system, or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements.

Moreover, although the social messaging system 130 is depicted in FIG. 1 as a three-tiered architecture, the inventive subject matter is by no means limited to such an architecture.

As shown in FIG. 1, the interface layer 124 comprises a interface module (e.g., a web server) 140, which receives requests from various client-computing devices and servers, such as client devices 110 each executing a client application 112, and third party servers 120 each executing a third party application 122. In response to received requests, the interface module 140 communicates appropriate responses to requesting devices via a network 104. For example, the interface module 140 can receive requests such as Hypertext Transfer Protocol (HTTP) requests, or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client application 112. The client application 112 can provide functionality to present information to a user 106 and communicate via the network 104 to exchange information with the social messaging system 130. Each client device 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client devices 110. In some embodiments, the user 106 interacts with the social messaging system 130 via the client devices 110.

As shown in FIG. 1, the data layer 128 has a database server 132 that facilitates access to an information storage repository or database 134. The database 134 is a storage device that stores data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes one or more application logic module 150, which, in conjunction with the interface module 140, generates various user interfaces using data retrieved from various data sources or data services in the data layer 128. The application logic module 150 can be used to implement the functionality associated with various applications, services, and features of the social messaging system 130. For instance, a social messaging application can be implemented with the application logic module 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module.

As illustrated in FIG. 1, the social messaging system 130 includes a gesture navigation system 160. In various embodiments, the gesture navigation system 160 can be implemented as a standalone system and is not necessarily included in the social messaging system 130. In some embodiments, the client devices 110 include a portion of the gesture navigation system 160 (e.g., a portion of the gesture navigation system 160 included independently or in the client application 112). In embodiments where the client devices 110 includes a portion of the gesture navigation system 160, the client devices 110 can work alone or in conjunction with the portion of the gesture navigation system 160 included in a particular application server or included in the social messaging system 130.

Figure 2:
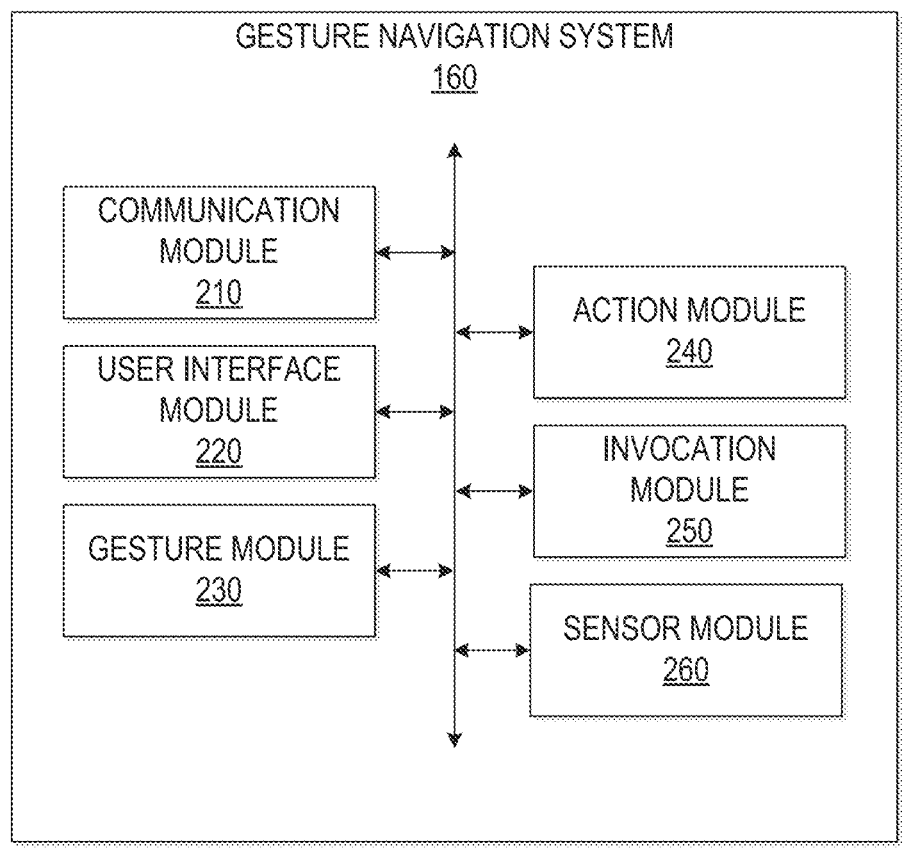
FIG. 2 is a block diagram illustrating an example embodiment of a gesture navigation system, according to some example embodiments.

FIG. 2 is a block diagram 200 of the gesture navigation system 160. The gesture navigation system 160 is shown to include a communication module 210, a user interface module 220, a gesture module 230, an action module 240, an invocation module 250, and a sensor module 260. All or some of the modules 210-260 communicate with each other, for example, via a network coupling, shared memory, and the like. Each module of the modules 210-260 can be implemented as a single module, combined into other modules, or further subdivided into multiple modules. Other modules not pertinent to example embodiments can also be included, but are not shown.

The communication module 210 provides various communications functionality. For example, the communication module 210 can facilitate performing a particular action by communicating with the social messaging system 130 or the third party server 120. The communication module 210 exchanges network communications with the database server 132, the client devices 110, and the third party server 120. The information retrieved by the communication module 210 includes data associated with the user 106 (e.g., member profile data from an online account or social network service data) or other data to facilitate the functionality described herein.

The user interface module 220 provides various presentation and user interface functionality operable to interactively present information to and receive information from the user (e.g., user 106). For instance, the user interface module 220 is utilizable to present a visual indication of an action to be performed or alter a user interface to emphasize a particular aspect of the user interface. In various embodiments, the user interface module 220 presents or causes presentation of information (e.g., visually displaying information on a screen, acoustic output, haptic feedback, etc.). The process of interactively presenting information is intended to include the exchange of information between a particular device and the user. The user may provide input to interact with the user interface in many possible manners, such as alphanumeric, point based (e.g., cursor or tactile), or other input (e.g., touch screen, light sensor, infrared sensor, biometric sensor, microphone, gyroscope, accelerometer, or other sensors). The user interface module 220 provides many other user interfaces to facilitate functionality described herein. The term "presenting" as used herein is intended to include communicating information or instructions to a particular device that is operable to perform presentation based on the communicated information or instructions.

The gesture module 230 provides functionality to detect aspects of a particular gesture from the user input data. For example, the gesture module 230 detects an initial point, a current point, a terminal point, satisfaction of a time threshold, satisfaction of a distance threshold, a discontinuity in a gesture, and other aspects of a particular gesture. In a specific example, the gesture module 230 detects a completion or termination of a gesture based on the user releasing their finger from a touchscreen display.

The action module 240 provides functionality to select and determine actions associated with a particular gesture. For example, the action module 240 identifies a particular action to perform based on a characteristic of a particular gesture such as a distance of a slide or drag gesture. In some examples, the action module 240 determines the action to perform based on the gesture in conjunction with a designated user interface element. For instance, the action module 240 determines a specific action for a particular designated user interface element and a different action for a different user interface element.

The invocation module 250 provides functionality to invoke a particular action. For example, an action may be performed locally (e.g., local file management) at the user device or invoked by communicating with a server or system (e.g., sending a message to a member of the social messaging service) such as the social messaging system 130. In a specific example, the invocation module 250 establishes a chat session between the user of the user device and another member of the social messaging service.

The sensor module 260 provides various sensor functionality such as touchscreen display input monitoring. In a specific example, the sensor module 260 monitors touchscreen display input such as positional information (e.g., x and y coordinates), force information, and timing information (e.g., a timeline associated with the positional or force information). The sensor module 260 can monitor sensor data via event driven update (e.g., receive touch data as it occurs), polling at a particular sampling rate, or continuously monitor output from a particular sensor.

Figure 3:
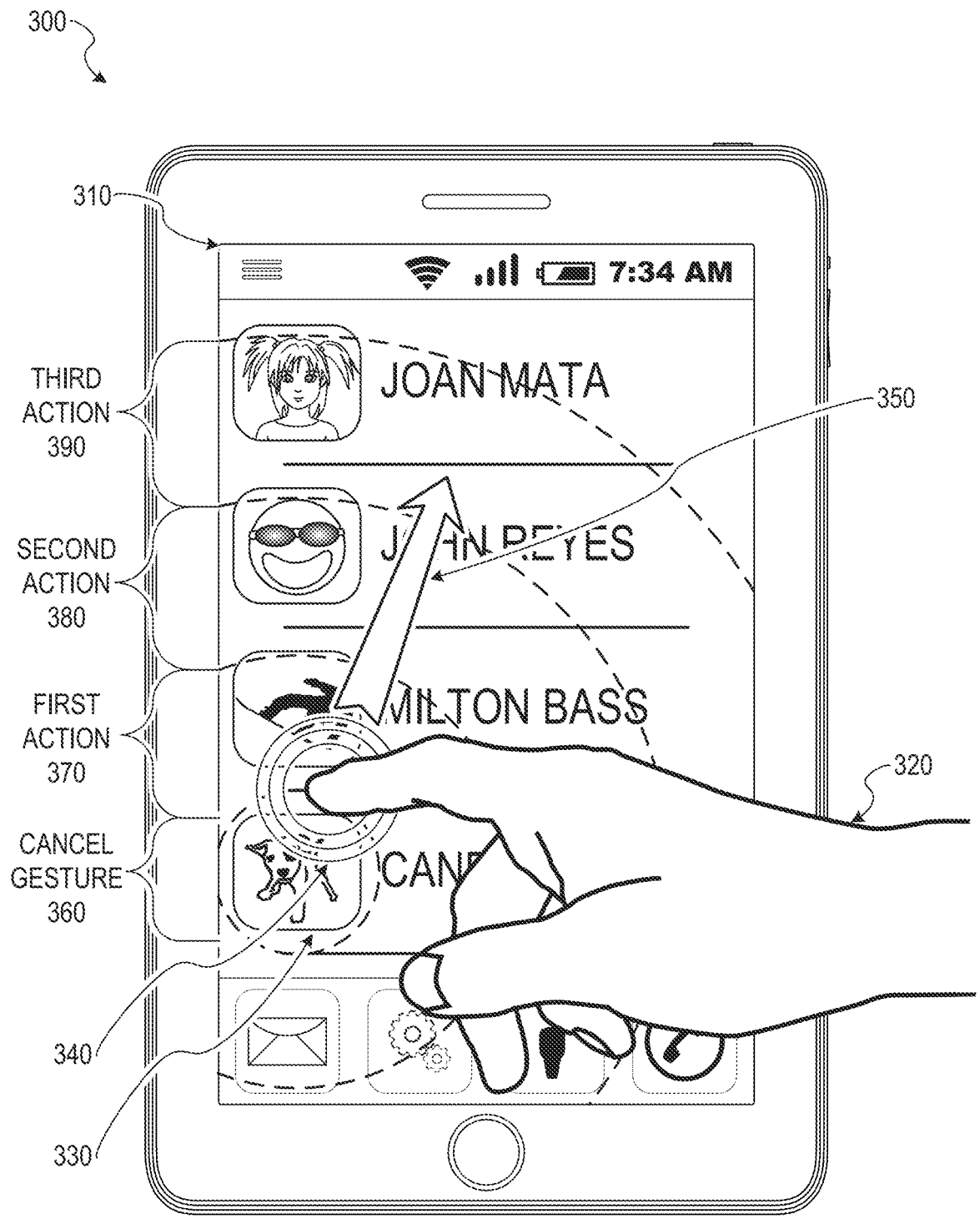
FIG. 3 is a user interface diagram depicting an example gesture on an example device, according to some example embodiments.

FIG. 3 is a user interface diagram 300 depicting an example gesture being performed on an example device (e.g., a smart phone) displaying example user interface 310. In the user interface 310, a user 320 is performing a radial slide gesture 350 to cause invocation of an action associated with user interface element 330. In the diagram 300, the sensor module 260 receives user input data that indicates the user 320 is physically touching a touchscreen display of the user device as shown by touch 340. The gesture module 230 detects an initial point and a current point of the radial slide gesture 350 and determines a radius distance for the radial slide gesture 350.

The action module 240 determines an action based on the radius distance of the radial slide gesture 350. For example, the action module 240 selects a first, second, or third action, 370, 380, or 390 respectively, when the radius distance is within a particular range corresponding to one of those actions. For example, the actions 370, 380, and 390 may perform a function associated with the designated user interface element 330. In a specific example, the first action 370 may 'like' or designate some item as a 'favorite' of the user, the second action 380 may initiate a text-based chat, and the third action 390 may initiate a video chat with a particular user associated with the designated user interface element 330. Put another way, concentric circles centered about the initial point can define boundaries for different ranges. The action module 240 selects an action for a particular range when the current point is within the boundaries for a particular range (e.g., greater than a first concentric circle boundary and less than a second concentric circle boundary that is consecutive to the first concentric circle boundary). After the action module 240 selects the action, the invocation module 250 performs, or facilitates performing, the selected action in response to detecting a completion of the radial slide gesture 350. For example, the gesture module 230 detects termination or completion of a radial slide gesture 350 when the user 320 releases or lifts their finger from the touchscreen. In some embodiments, the user cancels the radial slide gesture 350 (shown in the diagram 300 as cancel gesture 360), i.e., gives an instruction to perform no action, by terminating the radial slide gesture 350 within a distance of the initial point or beyond a particular distance or off screen.

In some example embodiments, the gesture module 230 initiates the radial slide gesture 350 or radial slide mode only after detecting a 'hold' gesture. For instance, the user 320 touches the touchscreen at the location of the user interface element 330 and substantially refrains from moving the current point of the touch 340 for a threshold period of time (e.g., 0.75 seconds). That is to say, the gesture module 230 detects the hold gesture when a hold time measure, beginning when the gesture module 230 detects the user first touching the touchscreen or when the current point is substantially not moving, exceeds the threshold period of time. After the threshold period of time expires, the radial slide gesture 350 is initiated. In some example embodiments, the gesture module 230 resets a hold time measure if the user moves the current point beyond a hold threshold distance (e.g., 0.2 inches or outside a boundary of a particular user interface element such as a virtual button) such as when the user does not substantially refraining from moving the current point. In other embodiments, the gesture module 230 does not reset the hold time measure and the hold gesture cannot be completed once the user moves the current point beyond a hold threshold distance. In these embodiments, the user performs the hold gesture by first lifting their finger from the touchscreen to reset the hold time measure and subsequently touching the touchscreen and perform another hold gesture. In some example embodiments, the user interface module 220 causes presentation of a visual indication that the radial slide mode is active after the hold gesture has been completed (e.g., a change in background color of a user interface on the touchscreen or a graphical or textual description indicating a current mode or successful completion of the hold gesture).

In some instances, the user 320 performs the radial slide gesture 350 as a continuation, or in succession, of the hold gesture (e.g., the user 320 remains in continuous physical contact with the touchscreen throughout the hold gesture and the radial slide gesture 350). Thus, the gesture module 230 can detect various combinations of successive gestures that are performed in series or, in some instances, gestures that are performed in parallel. The purpose of first initiating the radial slide gesture 350 is to prevent undesired user interface interaction and allow the user 320 to normally interact with the underlying user interface without triggering an action invocation via a particular radial slide gesture. Once the radial slide mode is initiated, the gesture module 230 can detect the user 320 performing a slide radially outward from the user interface element 330. The hold gesture may also function to designate a particular user interface element located at the initial point. The action module 240 then identifies action based on the designated user interface element.

In a specific example, the user interface 310 includes a list of contacts. The user 320 performs the radial slide gesture 350 to invoke an action associated with one of the contacts in the list of contact. For instance, the user 320 initiates a chat session, sends a message, or removes a contact from the list by performing the radial slide gesture 350 with an initial point being located at a particular contact in the list of contacts. In this way, the user 320 can quickly perform one of multiple actions associated with a user interface element anywhere on the display without the need of a button or another conventional input technique being on the display.

Figure 4:
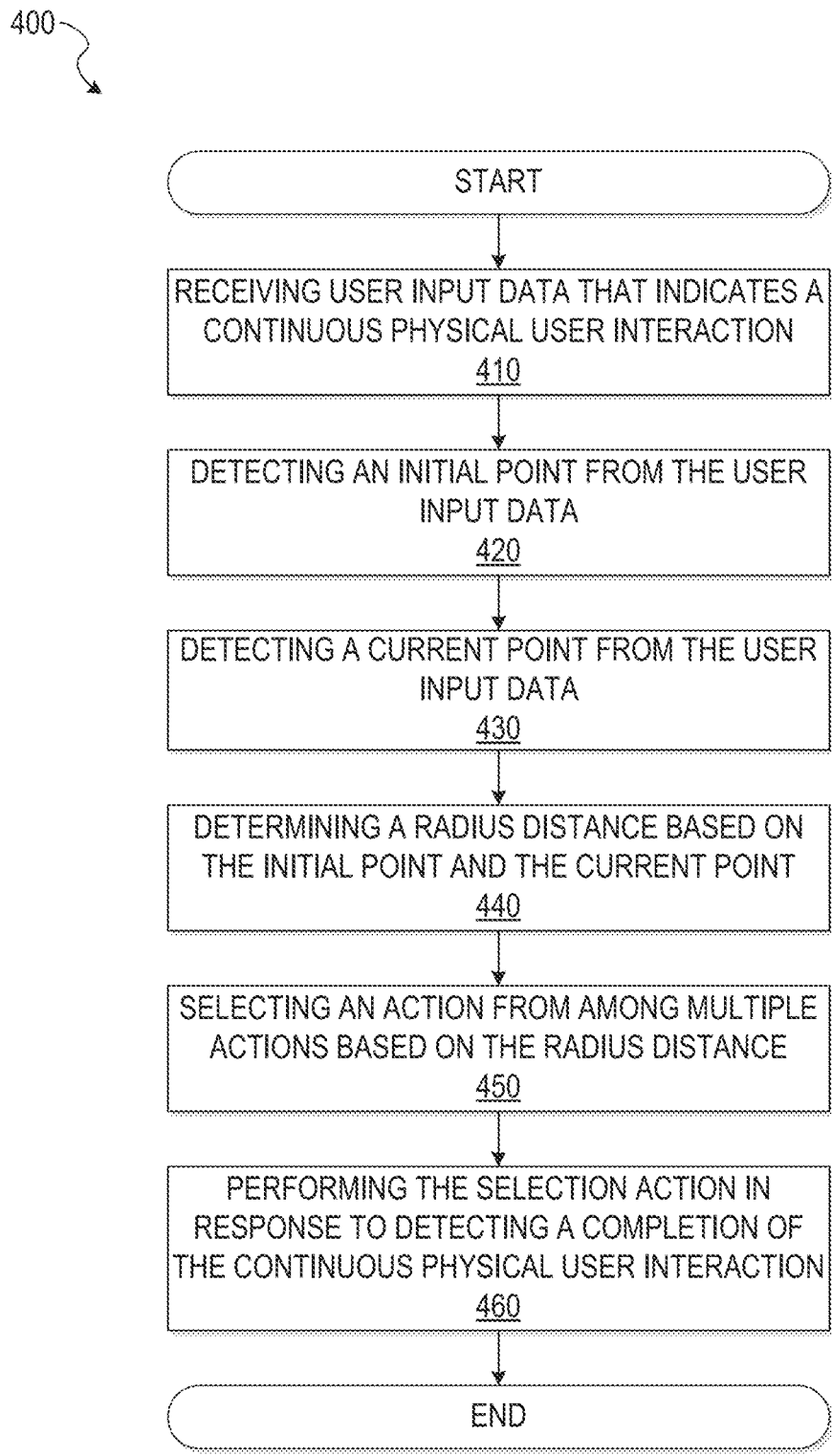
FIG. 4 is a flow diagram illustrating an example method for radial gesture navigation, according to some example embodiments.

FIG. 4 is a flow diagram illustrating an example method 400 for receiving and interpreting a user input such as a gesture. The operations of method 400 are performed by components of the gesture navigation system 160, and are so described below for the purposes of illustration.

At operation 410, the sensor module 260 receives user input data that indicates a continuous physical user interaction or gesture associated with a display screen of the user device. For example, the sensor module 260 continuously or periodically receives or retrieves user input data from a touchscreen. In various embodiments, the user input data indicates positional, force, and temporal data resulting from the user physically touching the touchscreen.

Figure 5:
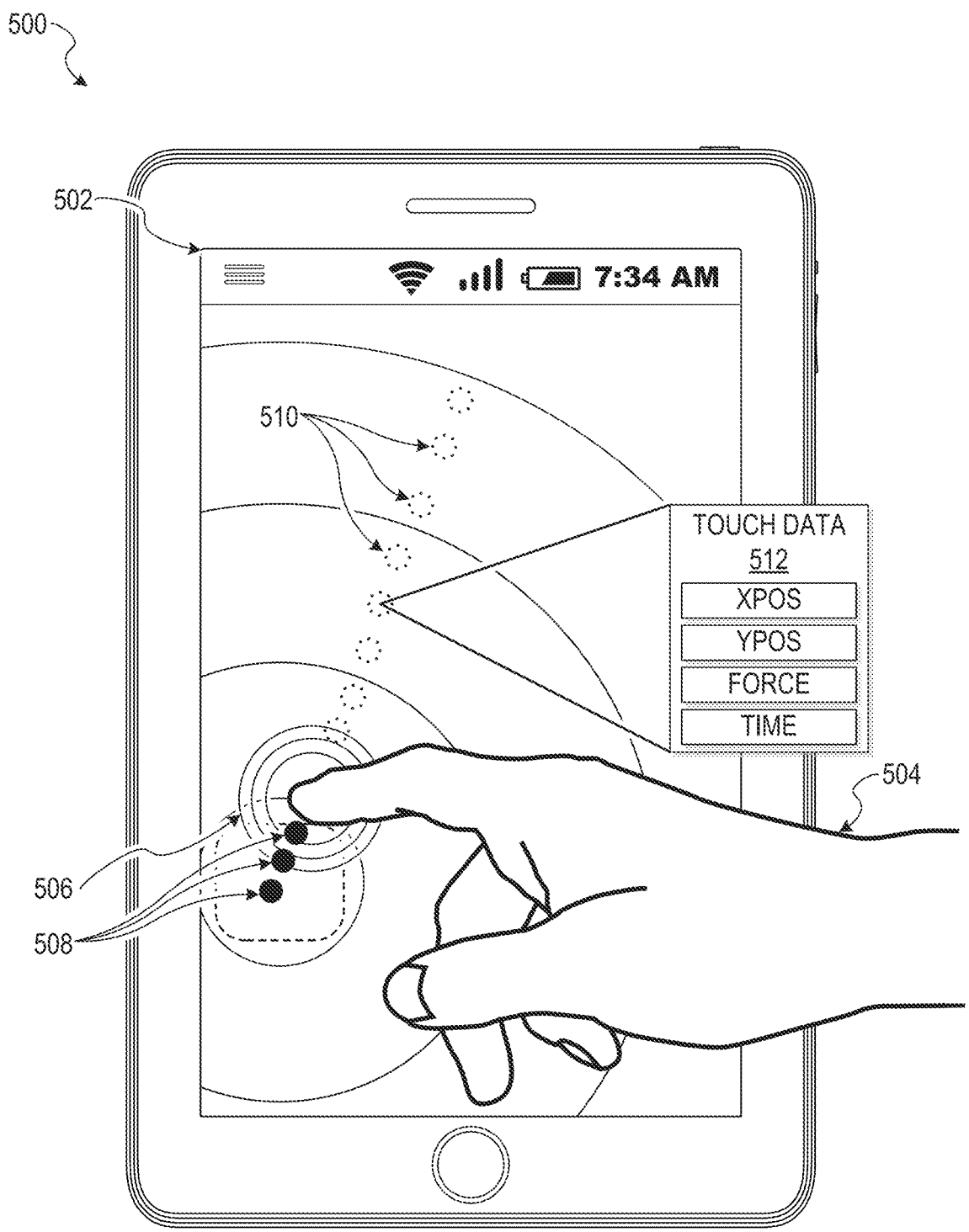
FIG. 5 is a diagram depicting detection of aspects of a gesture at an example touchscreen, according to some example embodiments.

To illustrate the concepts of operation 410, FIG. 5 is a diagram 500 which depicts user input data detected by the sensor module 260 and the gesture module 230. In the diagram 500, a user 504 performs a physical touch 506 on a touchscreen 502. In an example embodiment, the sensor module 260 receives the user input data that comprises a series of points in time corresponding to physical user input (e.g., the touch 506). For instance, points 508 and 510 are example points of a particular user gesture that the user 504 is currently performing at the touchscreen 502. In the diagram 500, the points 508 are points that have already occurred and points 510 are points that may occur when the user 504 completes the gesture. In an embodiment, each of the points 508 and 510 correspond to user input data such as touch data 512. As shown in the diagram 500, the touch data 512 comprises coordinate data for points (e.g., x and y coordinates), force data (e.g., pressure the user 504 may be applying to the touchscreen 502 at a particular point), temporal data (e.g., a timestamp for each point or indication of an order in which the points occurred in time). Although the diagram 500 shows the user input data or touch data 512 including coordinate points, it will be appreciated that the sensor module 260 can receive other types of positional data or touch data and the gesture module 230 can derive coordinate data from the other types of data.

Turning back to FIG. 4, at operation 420, the gesture module 230 detects an initial point or initial position from the user input data. In an embodiment, the initial point is a spatial point corresponding to a beginning of the continuous physical user interaction or gesture. That is to say, the initial point is a starting point on the touchscreen of a particular user gesture. For example, the initial point is the location on the touchscreen display where the user starts the radial slide gesture.

At operation 430, the gesture module 230 detects a current point from the user input data. In an embodiment, the current point is a spatial point corresponding to a current state of the continuous physical user interaction or gesture. In some embodiments, the sensor module 260 receives the user input data in real time or substantially real time. The current point corresponds to the current state of the user gesture or user interaction with the user device at a current moment in time. For instance, the current point is the location on the touchscreen display that the user is currently touching.

Figure 6:
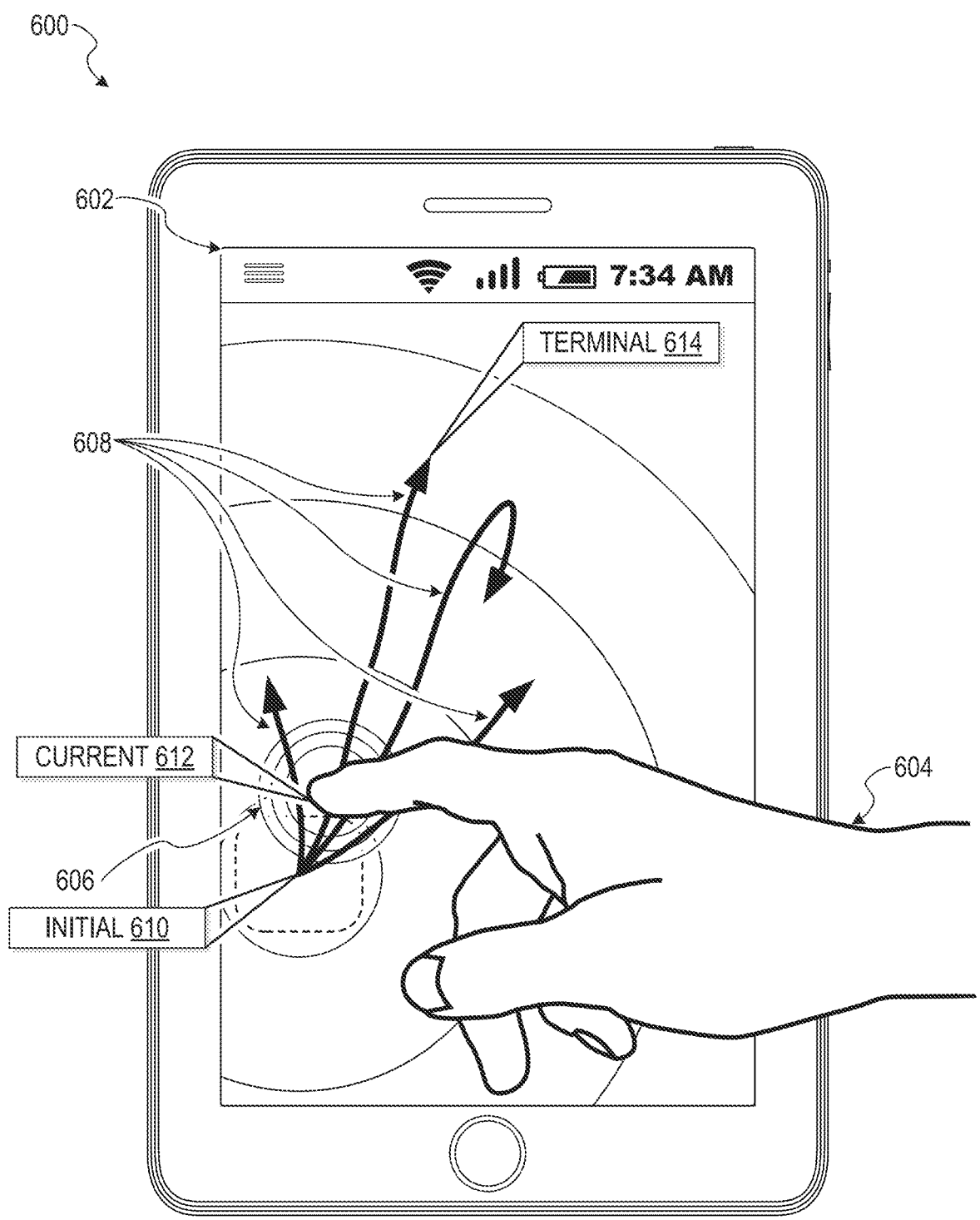
FIG. 6 is a diagram depicting aspects of various gestures, according to some example embodiments.

To illustrate the concepts of operations 420 and 430, FIG. 6 is a diagram 600 depicting aspects of various gestures 608. Similar to FIG. 5 discussed above, in the diagram 600, a user 604 performs a physical touch 606 on a touchscreen 602. In various example embodiments, each gesture of the various gestures 608 has an initial point, current point, and terminal point. As shown in the diagram 600, an example gesture of the various gestures 608 has initial point 610, current point 612, and terminal point 614. In an embodiment, the initial point 610 is a location on the touchscreen 602 where the user 604 first made physical contact to initiate a particular gesture. Although, in other embodiments, the initial point 610 is not necessarily the location at which the user 604 first made physical contact, but may be a location at which the user 604 initiated a particular gesture (e.g., via a press and hold gesture). For instance, the user first makes initial contact with the touchscreen 602 at a particular point and executes a hold gesture at another point on the touchscreen 602 while remaining in continuous physical contact with the touchscreen 602. In this instance, the initial point is the point or location at which the user executed the hold gesture to initiate the radial slide gesture and is not necessarily the point where the user first made contact with the touchscreen 602 (although in some cases the point of first contact by the user is the same point as where the hold gesture is performed by the user). The current point 612 is the location on the touchscreen 602 where the user 604 is currently making physical contact with the touchscreen 602. As shown in the diagram 600, the current point 612 can be co-located with the touch 606. The terminal point 614 is the location on the touchscreen 602 where the user 604 terminates or completes a particular gesture. For example, the user 604 terminates a particular gesture by releasing or lifting their finger or stylus from the touchscreen 602. The terminal point will coincide with the current point at a moment in time when the gesture is terminated.

Turning again to FIG. 4, at operation 440, the gesture module 230 determines a radius distance based on the initial point and the current point. In an example embodiment, the radius distance is a radius of a circle that includes the current point and is centered about the initial point. The radius distance is independent of angular information. That is to say, the angle formed between a reference line and a line extending through the initial point and the current point has no bearing on the radius distance. Put another way, the user can perform the radial slide gesture at a variety of angles with respect to a reference line of the display to select the same action since the distance of the radial slide gesture is determinative of the action and not necessarily the angle at which the radial slide gesture is performed.

At operation 450, the action module 240 selects an action from among multiple actions based on the radius distance, or radial distance, being within a particular range among successive ranges along a straight line that starts at the initial point and extends through the circle. For example, the action module 240 accesses a lookup table (stored locally at the user device or remotely at a server) that includes actions corresponding to particular radius distances and identifies the action for the radius distance by performing a lookup for a particular action using the determined radius distance. In some embodiments, the action module 240 performs the lookup of the action using a piece of data extracted from the user input data (e.g., the designated user interface element that indicates a member of the social messaging service) in conjunction with the radius distance to determine the action.

In further embodiments, the action module 240 receives or detects an indication of a designated user interface element. For instance, the gesture module 230 may detect the indication of the designated user interface element based on the initial point (e.g., the user interface element corresponding to the initial point). In other embodiments, the user specifies the designated user interface element, or multiple designated user interface elements, prior to performing the radial slide gesture. For instance, the user may select one or multiple items from a particular list and subsequently perform the radial slide gesture to invoke an action associated with the selected items. In a specific example, the user may select multiple individuals on a friends list and subsequently perform the radial slide gesture to initiate a group chat or identify those individuals as favorites among those on the friends list.

In various embodiments, the action module 240 identifies candidate actions available for a particular designated user interface element and dynamically determines the successive ranges for each of the candidate actions. For example, if the designated user interface element is an individual on a friends list of the user, the action module 240 may identify available communication modalities with the individual (e.g., the action module 240 may indicate that text-based chatting and text messaging are available but video or voice communications are not currently available for the individual). In this example, the action module 240 identifies the available communication modalities as the candidate actions. In other embodiments, the multiple actions are predefined for a type of designated user interface element or for a particular user interface. For instance, the multiple actions can comprise text messaging, voice streaming, or video streaming, for a particular designated user interface element that is associated with a member of the social messaging service.

In an example embodiment, each range among the successive ranges corresponds to a particular action among the multiple actions. In an example embodiment, the successive ranges are a series of consecutive ranges along a straight line. Since the successive ranges are independent of angular information, the successive ranges can also be conceptualized as regions formed by concentric circle boundaries. That is to say, the concentric circles are the boundaries for the successive ranges. In some instances, the length of each of the successive ranges is uniform. In other embodiments, the length of each of the successive ranges is not necessarily uniform. For example, each range of the successive ranges may become larger, or smaller, (e.g., exponentially with respect to distance from the initial point) as the range becomes further away from the initial point (e.g., the widest range being furthest from the initial point).

In some embodiments, the lengths of the successive ranges are predefined. In other embodiments, the action module 240 determines the length of each of the successive ranges dynamically. For example, the action module 240 determines the length of a particular range based on the initial point. In a specific example, if an initial point is near the edge of a display, the action module 240 may utilize ranges of longer length as there is more space (in the direction away from the edge) for the user to perform the radial slide gesture. In another example, the action module 240 determines the lengths of respective ranges of the successive ranges based on the designated user interface element. For instance, the designated user interface element may be associated with a certain set of actions, and the action module 240 determines the lengths of ranges based on a count of actions in the set of actions.

In further embodiments, the action module 240 determines the radius distance is within a no-action range. For example, the no-action range extends from the initial point to a specified distance. While the radius distance is within the no-action range, the action module does not select an action to perform. The purpose of the no-action range is to provide a way for the user to cancel or stop the radial slide gesture from performing an action. Thus, the invocation module 250 performs no action in response to detecting the termination or completion of the continuous physical user interaction while the radius distance is within the no-action range. In other embodiments, the no-action range could be beyond the edge of the display or an actual radial distance (e.g., 0.25-0.3 inches).

Figure 7:
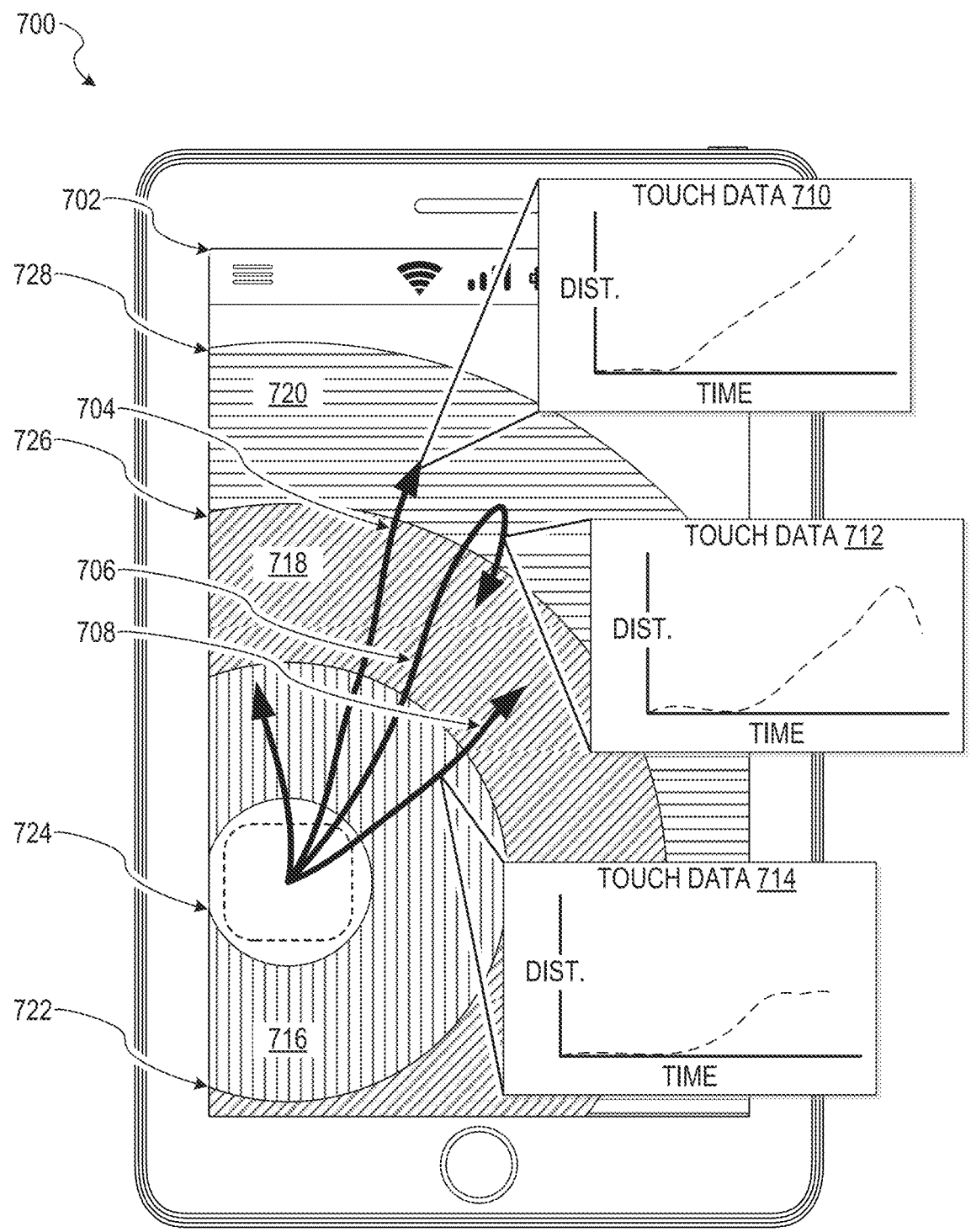
FIG. 7 is a diagram depicting various gestures, according to some example embodiments.

To illustrate the concepts of operations 440 and 450, FIG. 7 is a diagram 700 depicting various gestures on an example touchscreen 702. It will be appreciated that the illustrative elements of the diagram 700 are shown for the purposes of understanding the concepts described herein and are not shown to the user. That is to say, touch data 710, 712, and 714 are used by the gesture navigation system 160 internally and the regions, arrows, and graphs of the diagram 700 are for illustrative purposes and are not part of a particular user interface. As shown in the diagram 700, example gestures 704, 706, and 708 are respectively associated with the touch data 710, 712, and 714. For example, the touch data 710 for the gesture 704 shows a graph of distance versus time, the distance in the graph for the touch data 710 being the distance between the initial point and the current point. As indicated by the touch data 710, at first, the distance changes very little with time, and then the distance changes at a fairly steady rate with time. Such touch data (e.g., touch data 710) may be characteristic of the hold gesture immediately followed by the radial slide gesture. The gesture module 230 detects various characteristics or attributes of the gesture from touch data such as the touch data 710.

In various embodiments, the gesture module 230 determines the radius distance of the radial slide gesture, and the action module 240 selects a particular action based on the determined radius distance. For example, areas or regions 716, 718, and 720 with boundaries 722, 724, 726, and 728 may each correspond to a different action. In a specific example, the action module 240 selects a particular action corresponding to the region 718 when the radius distance falls between the boundaries 722 and 726. In this example, the user interface module 220 causes presentation of a visual indication of the available action for the region 718 (e.g., a textual or graphical description of what the action does). The purpose of the visual indication is to convey to the user what the currently selected action does to assist the user in deciding whether to perform the currently selected action. The multiple actions may include a wide variety of different actions that can be performed locally at the user device, remotely at a particular server, or a combination thereof. For example, the multiple actions include favoriting, liking, tagging, deleting or removing from a list, reordering a list, making a purchase, selecting an option for a particular purchase, sending a message, initiating a chat session, modifying an image captured by the user device, altering a system or user interface preference or option (e.g., a quality of a video render), and so on.

Returning to FIG. 4, at operation 460, the invocation module 250 performs the selected action in response to detecting a termination of the continuous physical user interaction while the radius distance is within the particular range for the selected action. The invocation module 250 can perform or facilitate performing the action locally at the user device or remotely by exchanging information with another server, device, or system. In a specific example, the invocation module 250 establishes a chat session between the user of the user device and another member of the social messaging service. In various embodiments, the user interface module 220 causes presentation of an indication that indicates a successful or failed completion or invocation of the selected action in response to the invocation module 250 successfully or unsuccessfully invoking the selected action.

Figure 8:
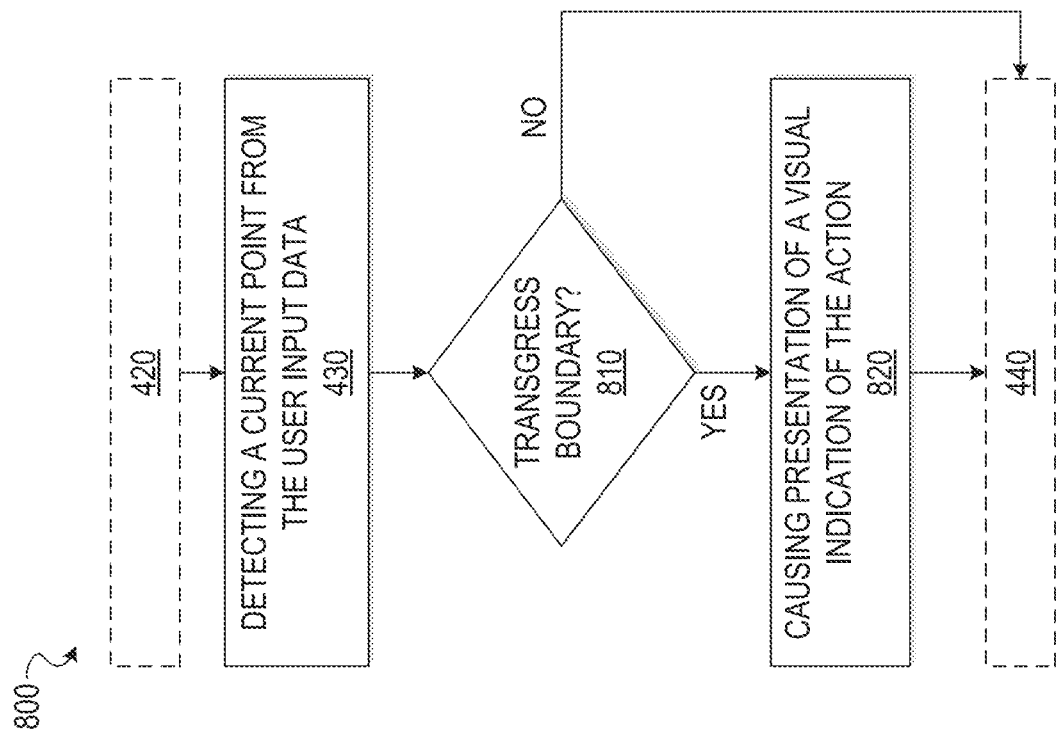
FIG. 8 is a flow diagram illustrating example operations for presenting a visual indication of an action associated with a gesture, according to some example embodiments.

FIG. 8 is a flow diagram 800 illustrating example operations for presenting a visual indication of an action associated with a gesture. As described above, at operation 420, the gesture module 230 detects an initial point from the user data. Subsequently, at operation 430, the gesture module 230 detects a current point from the user input data. In some embodiments, the operations of FIG. 8 are performed subsequent to the operation 430.

At operation 810, the gesture module 230 determines when the radius distance of the radial slide gesture transgresses a particular boundary for a particular range among the successive ranges. That is to say, when the path of the radial slide gesture falls within a new range of the successive ranges (shown as "yes" in the diagram 800), the user interface module 220 causes presentation of a visual indication associated with the new range. Conversely, if the gesture module 230 determines the radius distance has not transgressed the particular boundary, then the gesture navigation system 160 simply proceeds to operation 440 (shown as "no" in the diagram 800) skipping operating 820.

At operation 820, after the gesture module 230 determine the radius distance transgresses the particular boundary, the user interface module 220 causes presentation of a visual indication of the selected action in response to the current point transgressing a boundary of the particular range. For example, the visual indication may indicate a function of an action associated with the new range (e.g., textual or graphical description of the action). In an embodiment, the visual indication remains on the display while the action is available to the user (e.g., until the user moves the touch to transgress another boundary or until the user completes the radial slide gesture by, for example, releasing their finger from the touchscreen).

In some embodiments, the user interface module 220 causes presentation of a visual indication on the user interface of the user device that indicates the selected action cannot be performed or that no action can be performed. For example, the action module 240 may determine that there are no actions available for a particular designated user interface element and in response to this determination, the user interface module 220 presents the visual indication to indicate that no actions can be performed. In another example, the action module 240 determines that a particular action among the multiple actions is not available to be performed, and in response to this determination, the user interface module 220 presents a visual indicate to indicate that the particular action cannot be performed.

Figure 9:
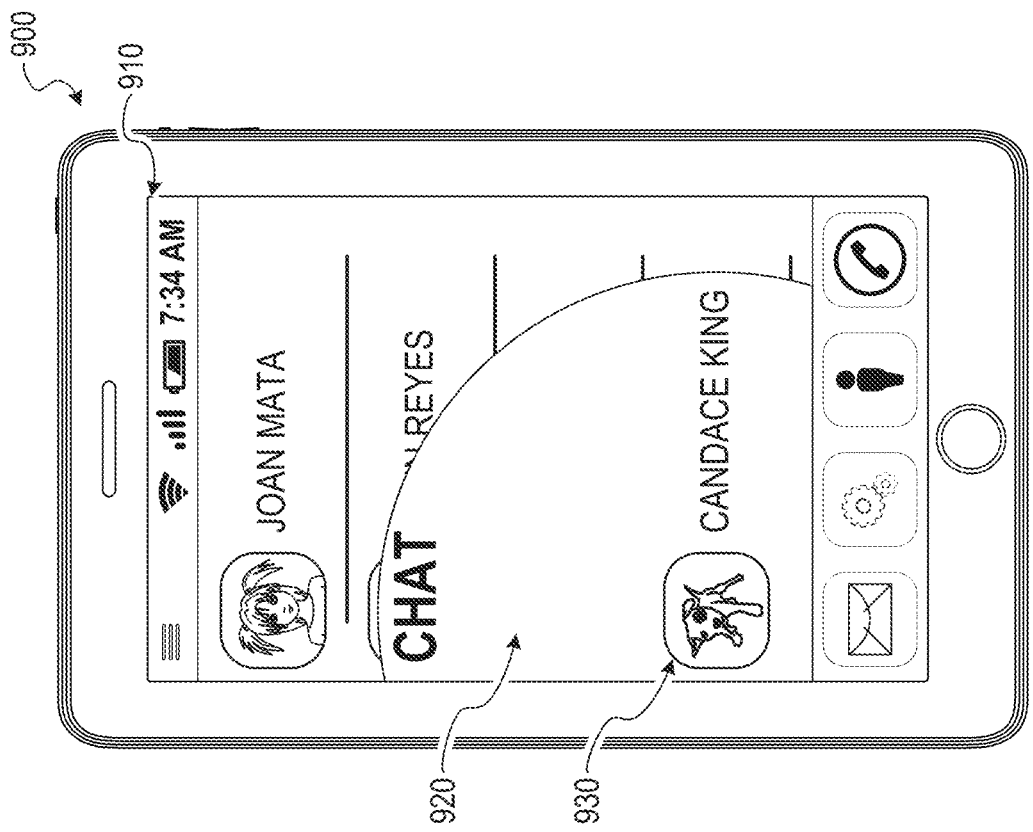
FIG. 9 is a user interface diagram depicting an example visual indication of an action displayed on an example device, according to some example embodiments.

FIG. 9 is a user interface diagram 900 depicting an example visual indication 920 of an action displayed on an example touchscreen 910. In an example embodiment, the user interface module 220 causes presentation of the visual indication 920 overlaid on top of a user interface of the touchscreen 910. In some embodiments, the user interface module 220 does not obscure a portion of the user interface or a particular user interface element with the visual indication 920. For instance, a designated user interface element 930 may remain unobscured by the visual indication 920, as shown in the diagram 900.

In further embodiments, the user interface module 220 deactivates a portion of the user interface, or at least one user interface element of the user interface, after detecting the initial point or when the radial slide gesture is initiated to prevent user interaction with the deactivated portion of the user interface. This is to prevent undesired interaction with user interface elements while the user is performing the radial slide gesture.

Figure 10:
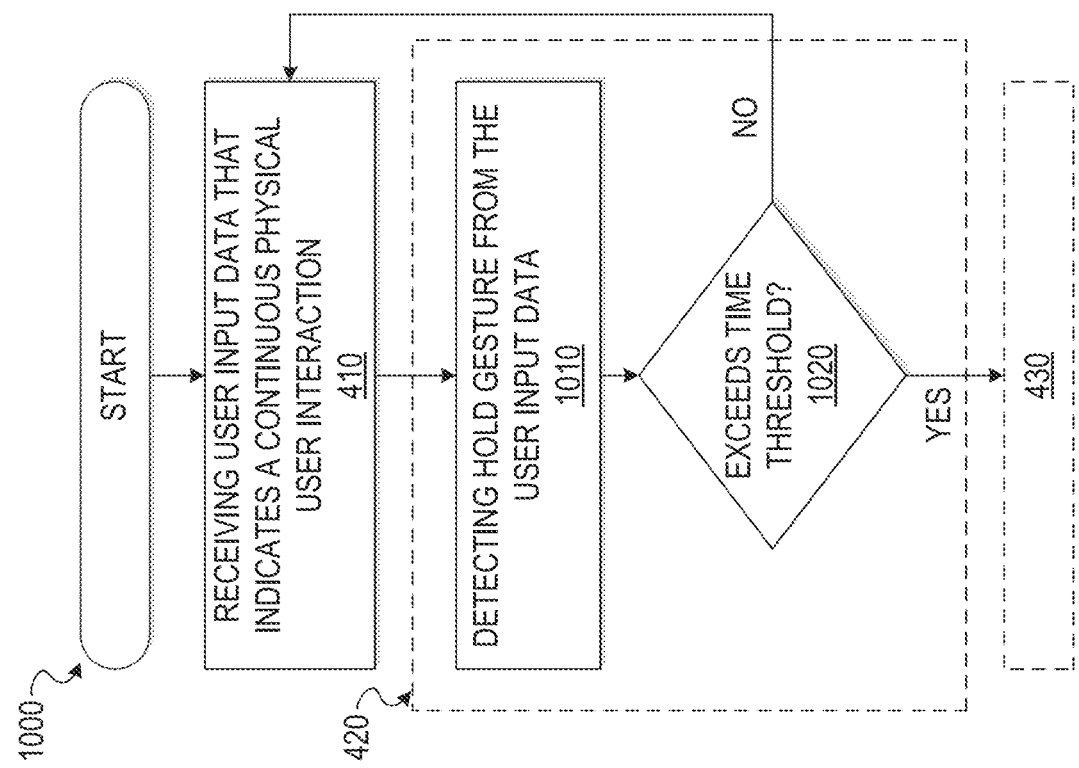
FIG. 10 is a flow diagram illustrating example operations for detecting certain aspects of a gesture, according to some example embodiments.

FIG. 10 is a flow diagram 1000 illustrating example operations for detecting certain aspects of a gesture. As described above, at operation 410, the sensor module 260 receives the user input data. At operation 420, the gesture module 230 detects the initial point from the user data. In some embodiments, operation 420 includes the additional operations of FIG. 10.

At operation 1010, the gesture module 230 detects a hold gesture at the initial point from the user input data. For instance, the hold gesture can comprise the user touching the touchscreen at a particular location and substantially refraining from moving the current point of the touch for a threshold period of time.

At operation 1020, the gesture module 230 determines if a threshold period of time has expired. In various embodiments, after the gesture module 230 determines the threshold period of time has expired, the radial slide gesture is initiated (shown as "yes" in the diagram 1000) or, stated another way, a radial slide mode begins. If the threshold period of time has not expired and the user has either terminated the hold gesture (e.g., lifting the user's finger from the touchscreen) or moved the current point away from the initial point (e.g., moved by more than a hold threshold distance), the gesture navigation system 160 does not perform subsequent operations and returns to operation 410 to receive more user input data (shown as "no" in the diagram 1000). In some instances, the user performs the radial slide gesture 350 as a continuation of, or in succession of, the hold gesture (e.g., the user remains in continuous physical contact with the touchscreen throughout the hold gesture and the radial slide gesture 350). The purpose of first initiating the radial slide gesture is to prevent undesired user interface interaction and allow the user to normally interact with the underlying user interface. Once the radial slide mode is initiated, the gesture module 230 can detect the current point from the user input data at the operation 430, as shown in the diagram 1000.

Figure 11:
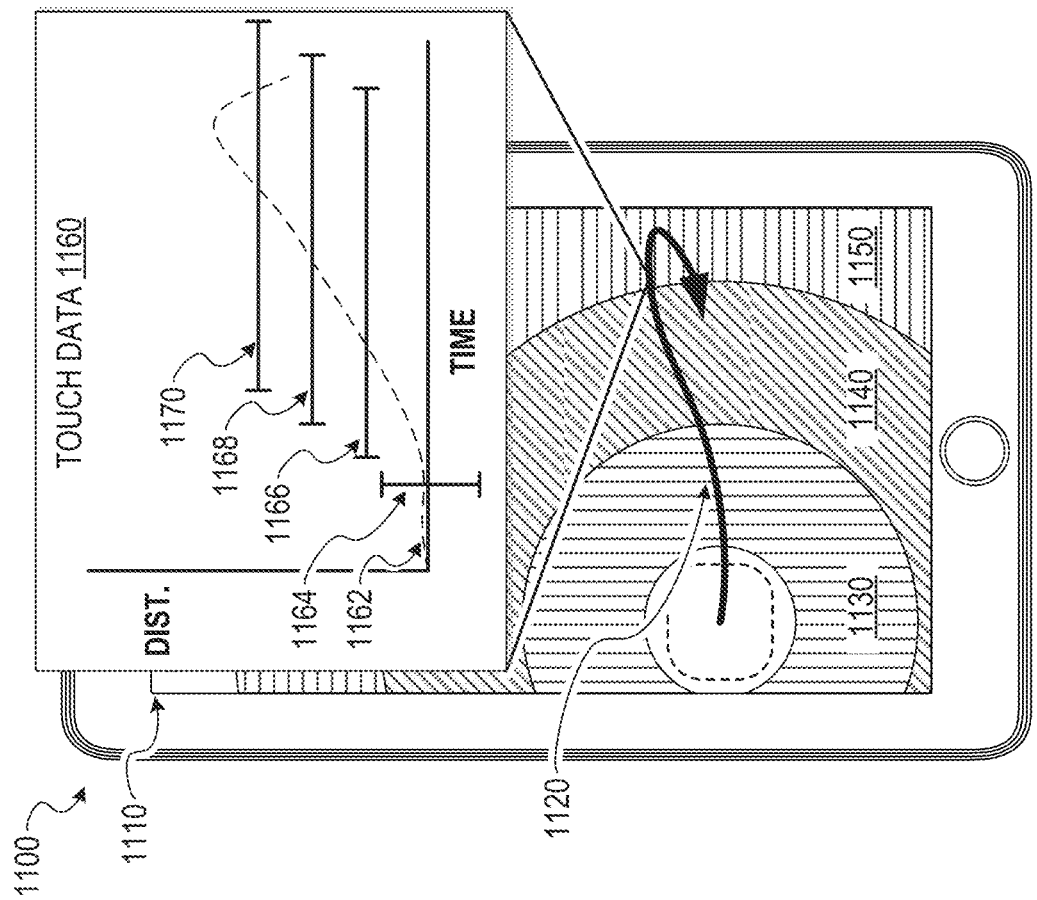
FIG. 11 is a user interface diagram depicting example data used to detect a gesture, according to some example embodiments.

To illustrate the concepts of FIG. 10, FIG. 11 is a user interface diagram 1100 depicting example data used to detect a radial slide gesture 1120 at a touchscreen 1110. The regions 1130, 1140, and 1150 correspond to different actions that the user can select by performing the radial slide gesture 1120. In some embodiments, the user can perform the radial slide gesture 1120 outward from the initial point and then return inward towards the initial point to cycle to a previous action. As described above for other illustrative figures, it will be appreciated that the illustrative elements of the diagram 1100 are shown for the purposes of understanding the concepts described herein and are not shown to the user. That is to say, the touch data 1160 is used by the gesture navigation system 160 internally and the regions, arrows, and graphs of the diagram 1100 are for illustrative purposes and are not part of a particular user interface. The touch data 1160 shows example user input data that the sensor module 260 may receive in response to the gesture 1120. Graph line 1162 (the dotted line in the graph of the touch data 1160)

shows the change in the radius distance of the radial slide gesture 1120 versus time. Threshold 1164 is a time threshold. For example, the gesture module 230 may first detect a hold gesture prior to detecting an instance of a radial slide gesture (e.g., the radial slide gesture 350, 1120 as described above). As shown by the touch data 1160, if the graph line 1162 remains substantially in the same location for the threshold 1164 period of time, the gesture module 230 detects the hold gesture and proceeds to detect the radial slide gesture 1120. The thresholds 1166, 1168, and 1170 are distance thresholds that correspond to the region 1130, 1140, and 1150. As shown by the touch data 1160, the radial slide gesture 1120 was terminated or completed in-between the distance threshold 1168 and 1170, which corresponds to an action associated with the region 1140.

Figure 12:
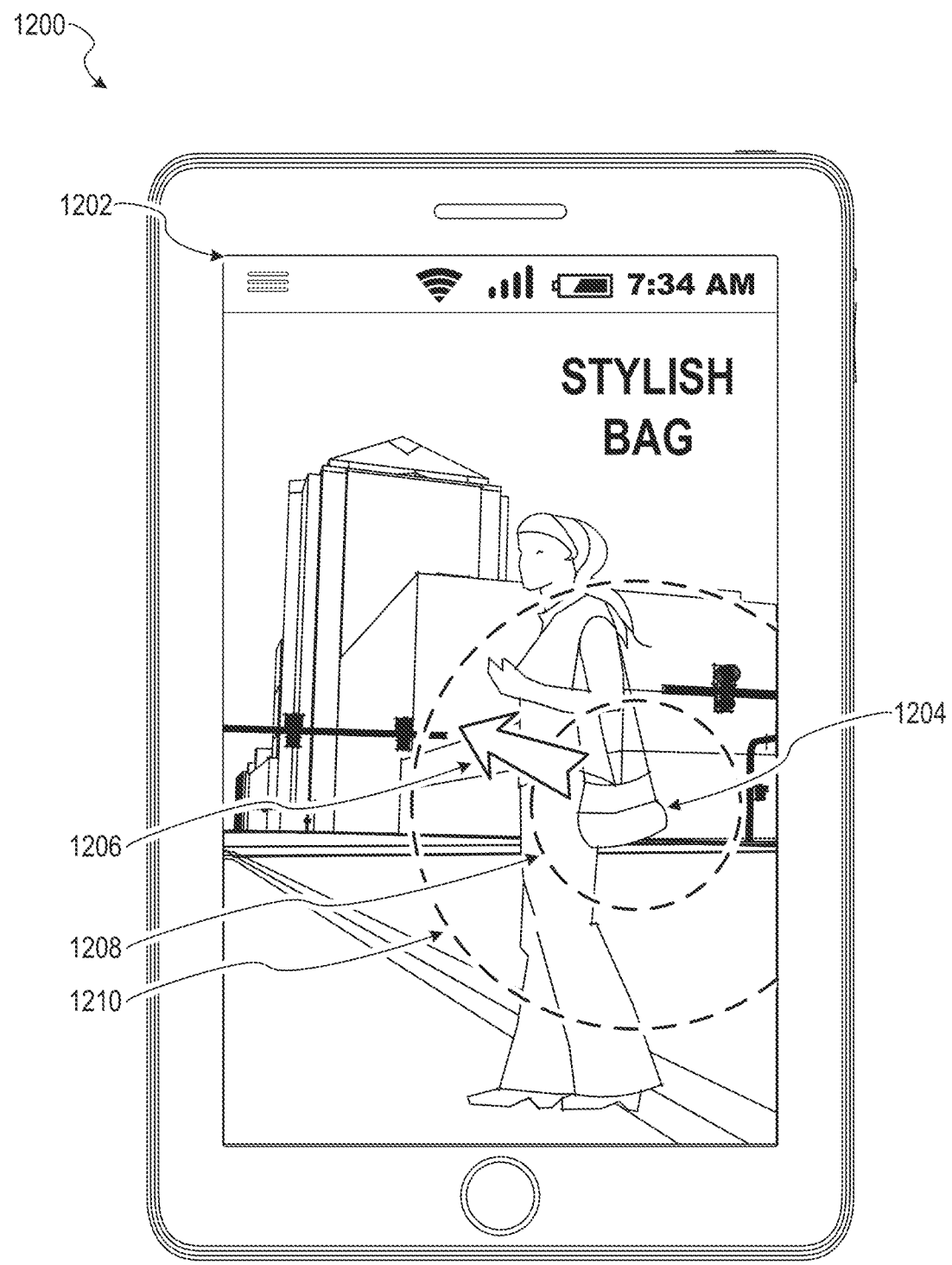
FIG. 12 is a user interface diagram depicting an example of performing an action associated with a particular item using a gesture, according to some example embodiments.

FIG. 12 is a user interface diagram 1200 depicting an example of performing an action associated with an item 1204 that is shown on a touchscreen 1202 using a radial slide gesture 1206. The touchscreen 1202 may display an article, digital magazine story, or another piece of digital media from a digital media channel. In an example embodiment, the user can interact with a particular item from the digital media via the radial slide gesture 1206. For example, the user may wish to purchase a particular item shown in the touchscreen 1202. In the diagram 1200, the user can initiate a purchase flow by touching and holding the item in the touchscreen 1202 at a location of the item of interest (e.g., the item 1204) and subsequently performing the radial slide gesture 1206. In an embodiment, different attributes of the purchase (e.g., quantity, color, size, using a particular payment account to pay for the purchase) can be selected based on the radius distance of the radial slide gesture 1206. For example, if the user completes the radial slide gesture 1206 within the boundaries of 1208 and 1210, the user may initiate a purchase flow for the item with least expensive options (e.g., slowest shipping and fewer accessories). In another example, if the user completes the radial slide gesture 1206 outside the boundary 1210, the user may initiate a purchase flow for the item with more expensive options (e.g., a fastest shipping or, in the case of concert tickets, better seating). Accordingly, the radial slide gesture 1206 provides a high degree of interactivity with the digital media without visually obscuring the content of the digital media.

Figure 13:
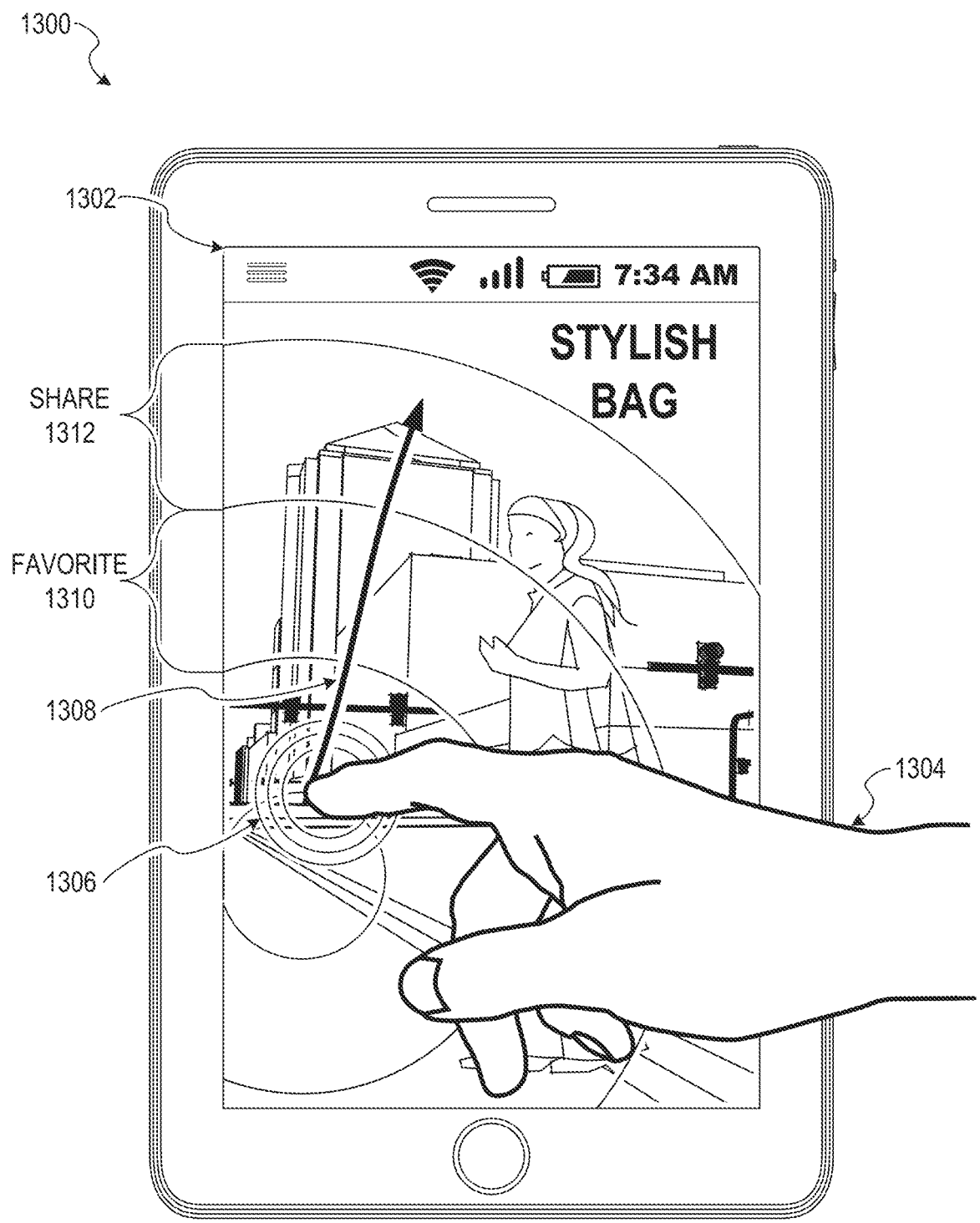
FIG. 13 is a user interface diagram depicting an example of performing an action using a gesture, according to some example embodiments.

FIG. 13 is a user interface diagram 1300 depicting an example use case of the techniques described above. In the diagram 1300, a user 1304 performs a physical touch 1306 at a particular point on a touchscreen display 1302. For example, the touchscreen display 1302 may be displaying digital media such as a digital magazine article, a video, a photograph, a text message, an interactive webpage, or another type of digital media. In these examples, the user 1304 performs an action associated with the digital media by performing a hold gesture followed by a radial slide gesture 1308. For instance, the user 1304 physically touches anywhere on the digital media and substantially refrains from moving the current point of the physical touch for a threshold period of time (e.g., 0.75 seconds), and then performs the radial slide gesture 1308 to select a particular action. In a specific example, the user 1304 invokes an action such as favoriting, sharing, or sending to friends or contacts on the social messaging service the digital media by performing the slide gesture 1308 to within a particular range such as indicated by favorite 1310 and share 1312. In this way, the user 1304 can share a particular piece of digital media by directly interacting with the digital media on the touchscreen display 1302.

Figure 14:
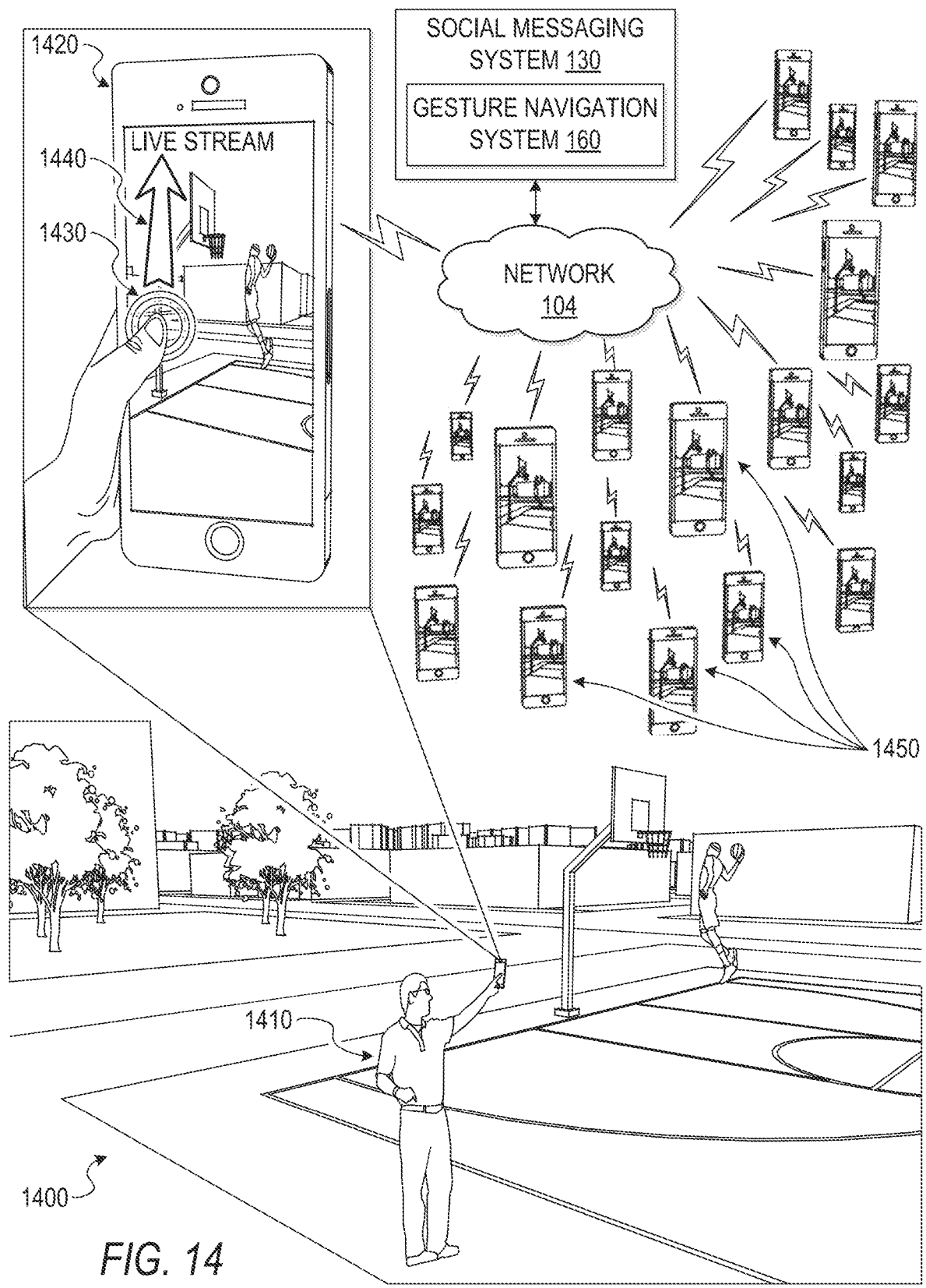
FIG. 14 is a diagram illustrating an example of initiating a live streaming session of media data being captured in real time by a user device, according to some example embodiments.

FIG. 14 is a diagram 1400 illustrating an optional example embodiment of initiating a live video stream of media data being captured in real time by a user device 1420 of a user 1410. Although the diagram 1400 depicts the gesture navigation system 160 in the social messaging system 130, in other example embodiments, the gesture navigation system 160, or a portion of the gesture navigation system 160, can be implemented in the user device 1420. In embodiments where the user device 1420 includes a portion of the gesture navigation system 160, the user device 1420 can work alone or in conjunction with the portion of the gesture navigation system 160 included in a particular application server or included in the social messaging system 130.

In the diagram 1400, the user device 1420 is capturing media data from a sensor of the user device 1420 that is communicatively coupled to the social messaging system 130 via the network 104. The media data comprises, for example, audio data alone, video data alone, audio/video data, or other data of the user device 1420. For instance, the audio/video data is captured by a camera sensor and a microphone of the user device 1420. In various example embodiments, the user device 1420 records the audio/video data meaning that the user device 1420 stores the audio/video data locally at the user device 1420, remotely at the social messaging system 130, or at a particular third-party server. The user 410 can initiate a live stream (e.g., a live broadcast) of the captured audio/video by performing a gesture 1440 with a physical touch 1430 on a touchscreen of the user device 1420. In some example embodiments, the user 1410 switches between a recording mode or recording session that records the audio/video data and a streaming mode or live streaming session that live steams the audio video data to a plurality of other user devices 1450. For instance, the user 1410 switches from a recording mode to a live streaming mode by performing the gesture 1440 while the user device 1420 is currently in the recording mode.

In various example embodiments, the live stream of the audio/video data being captured by the device 1420 is communicated or transmitted to the social messaging system 130 and subsequently communicated, transmitted, or broadcast to the plurality of other user devices 1450 via the network 104. In an example embodiment, the plurality of other user devices 1450 includes devices of particular members of the social messaging system 130. In some embodiments, the particular members of the social messaging system are friends or contacts of the user 1410 on the social messaging system 130. In other embodiments, the particular members of the social messaging system are subscribed to receive the live stream of the audio/video data being captured by the user device 1420 (e.g., subscribed to a particular channel where the live stream is available). In further example embodiments, the live stream is publicly available, exclusively available to certain users, or a combination thereof.

In various example embodiments, the live stream is being broadcast in substantially real time. A real time stream or live stream is intended to include streams that are delivered (e.g., received and presented to a particular device) to a destination (e.g., the plurality of other user devices 1450) after a delay interval (e.g., due to transmission delay or other delays such as being temporarily stored at an intermediate device) between the instant that the audio/video data is captured by the user device 1420 and a delivery time that the audio/video data is delivered to the destination. For instance, the audio/video data being captured by the user device 1420 and live streamed to the plurality of other user devices 1450 can be buffered at the user device 1420, at the social messaging system 130, or another intermediate device and delivered to the destination after a buffering delay.

In some example embodiments, the user device 1420 is live streaming the audio/video data and recording the audio/video data at the same time. In other example embodiments, the user device 1420 is live streaming the audio/video data without the audio/video data being recorded or stored. In these embodiments, the gesture navigation system 160 or the social messaging system 130 provides the user 1410 with an option to store the streamed audio/video data during the live streaming session or after the live streaming session is over. For instance, the user 1410 may initiate live streaming only of the audio/video data and then select an option to store or discard the audio/video data that was live streamed after the live streaming session has stopped.

Figure 15:
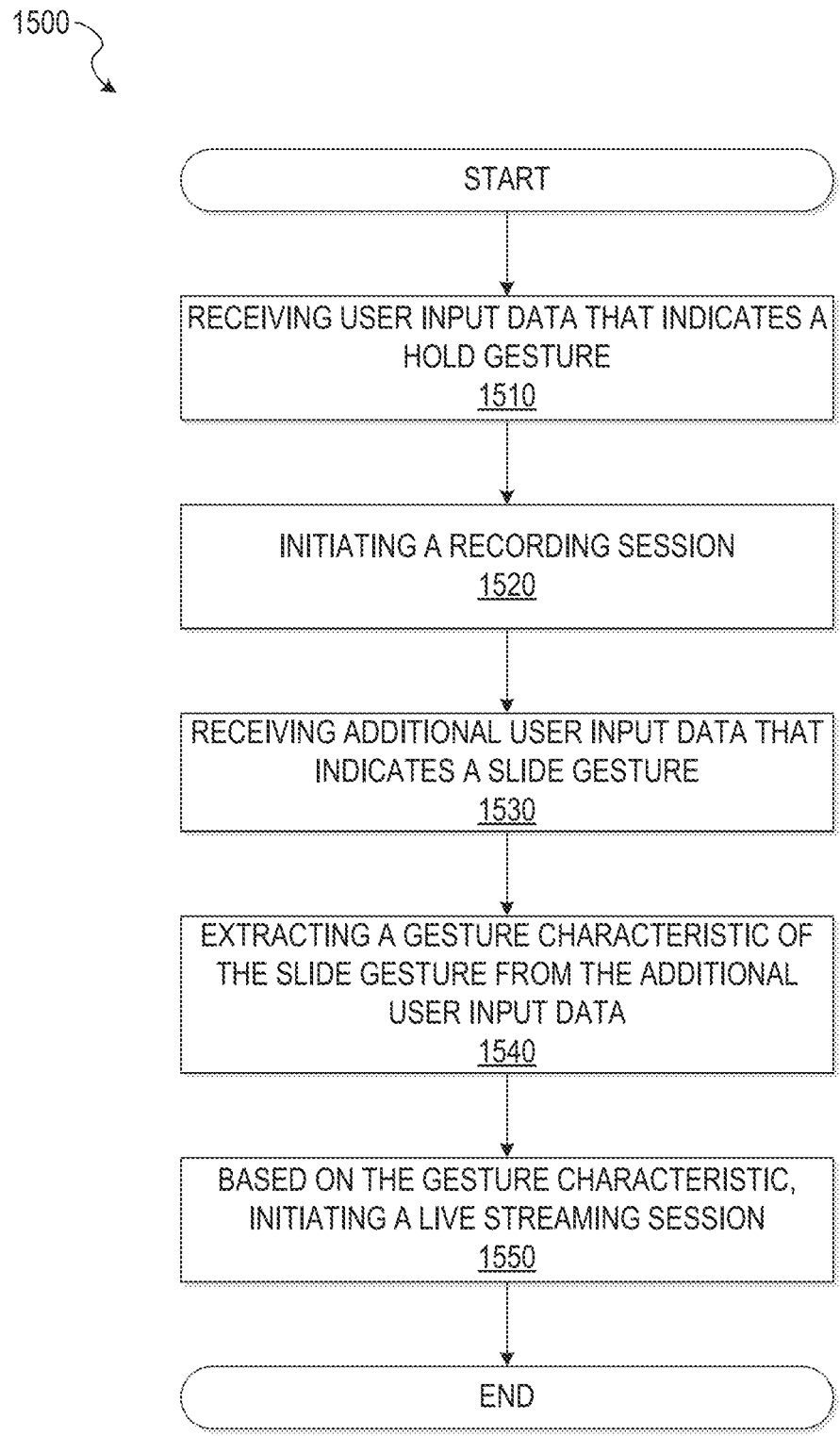
FIG. 15 is a flow diagram illustrating an example method for switching between a recording session and a live streaming session, according to some example embodiments.

FIG. 15 is a flow diagram illustrating an example method 1500 for switching between a recording session and live streaming session. The operations of method 1500 are performed by components of the gesture navigation system 160, and are so described below for the purposes of illustration.

At operation 1510, similar to operation 410 described above in connection with FIG. 4, the sensor module 260 receives user input data that indicates a continuous physical user interaction (a gesture) associated with a display screen of the user device. For example, the user performs a gesture or a combination of gestures such as a press and hold gesture followed by a slide or drag gesture on a touch-sensitive display of a mobile device of the user. In a specific example, the user performs a hold gesture on a particular user interface element on a touchscreen of the user device.

At operation 1520, the invocation module 250 initiates a recording session. For example, the gesture module 230 extracts a gesture characteristic from the user input data (e.g., a particular user interface element designated by a hold gesture), the action module 240 selects an action to initiate the recording session based on the extracted gesture characteristic, and then the invocation module 250 invokes or initiates the recording session. The recording session records or stores media data captured by one or more sensors of the user device such as a microphone and a camera sensor. The media data can comprise audio/video recording, audio only recording, video only recording, or recording of data from another device sensor or other device data (e.g., user interface image data that is currently being displayed on the user device). In an example embodiment, the media data is stored locally on the user device, remotely on a server, or a combination thereof.

At operation 1530, the sensor module 260 receives user additional user input data that indicates a slide gesture. For example, the user performs the slide gesture in succession to the hold gesture described above in operation 1510.

At operation 1540, the gesture module 230 extracts a gesture characteristic of the slide gesture from the additional user input data. In an example embodiment, the slide gesture is the radial slide gesture as described above. In this embodiment, gesture module 230 extracts the radius distance or radial distance from the slide gesture. In another embodiment, the slide gesture designates a particular user interface element. For example, the gesture module 230 designates the particular user interface element in response to determining the slide gesture terminated (e.g., the user lifting their finger from the touchscreen or the user refraining from moving the current point of the slide gesture for a threshold period of time) at the particular user interface element.

At operation 1550, the action module 240 determines the extracted gesture characteristic satisfies a condition and the invocation module 250 initiates a live streaming session. The invocation module 250 invokes or initiates the live streaming session that broadcasts, transmits, or otherwise communicates the media data being captured by the user device to other user devices (e.g., the plurality of other user devices 1450). For example, if the gesture characteristic is a radius distances and the action module 240 determines the radius distance is within a range corresponding to a live stream action, the invocation module 250 initiates the live streaming session. In another example, if the gesture characteristic is a designated user interface element corresponding to a live stream action, the invocation module 250 initiates the live streaming session.

FIG. 16 is a user interface diagram 1600 depicting an example of initiating a recording session with an option to switch to a live streaming session. In the diagram 1600, a user 1604 performs a physical touch 1614 of a touchscreen 1602. In an example embodiment, the sensor module 260 receives the user input data resulting from the physical touch 1614 and the gesture module 230 extracts a gesture characteristic from the user input data, the action module 240 identifies a particular action based on the gesture characteristic, and the invocation module 250 invokes the particular action.

In a specific example, the user 1604 activates a user interface element 1616 by performing the physical touch 1614 at an area encompassed by the user interface element 1616. In this example, activating the user interface element 1616 initiates the recording session or recording mode and the media data captured by the user device is stored or recorded. In an example embodiment, the user interface module 220 causes presentation of an indication 1606 that indicates a current mode of the user device.

In various example embodiments, after the invocation module 250 initiates the recording session, the user interface module 220 causes presentation of various user interface elements 1608 corresponding to options. For instance, a user interface element 1610 corresponds to an option to initiate a streaming session during the recording session. In an example embodiment, the user 1604 performs a slide gesture 1612 to one of the various user interface elements 1608 to invoke a particular action. The user interface module 220 can cause presentation of the various user interface elements 1608 according to a predefined scheme or dynamically based on the user input data. For example, the user interface module 220 can arrange the various user interface elements 1608 to encircle an initial point of a particular gesture. In further example embodiments, the user interface module 220 may modify the arrangement of the various user interface elements 1608 based on how close the initial point of the gesture is to the edge of the touchscreen 1602 or another characteristic extracted from the user input data. In various example embodiments, each of the various user interface elements 1608 includes an indication of an action. The action module 240 may dynamically determine the action corresponding to respective ones of the various user interface elements 1608 (e.g., based on a user interface element designated by an initial point of a particular gesture).

FIG. 17 is a user interface diagram 1700 depicting an example of switching from a recording session to a streaming session. In the diagram 1700, a user 1704 performs a physical touch 1710 of a touchscreen 1702. As the user 1704 moves the current point of the physical touch 1710 towards a user interface element 1708, the user interface module 220 alters or modifies the user interface element 1708. For example, the user interface module 220 changes an opacity, a color, or a size of the user interface element 1708 based on a distance between the current point of the physical touch 1710 and the position of the user interface element 1708 on the touchscreen 1702. In further embodiments, the user interface module 220 causes presentation of information associated with the live streaming session such as connectivity information of the user device (e.g., signal strength, roaming, connection speed, and so on) and may provide an indication of whether the invocation module 250 can initiate the live streaming session based on the connectivity information. In the diagram 1700, the user 1704 designates the user interface element 1708 to initiate a streaming session. For example, the user 1704 performs a slide gesture from user interface element 1712 to the user interface element 1708 to switch from the recording session to the streaming session. In some example embodiments, the user interface module 220 causes presentation of an indication 1706 of the current mode of the user device such as being in a streaming session.

Figure 18:
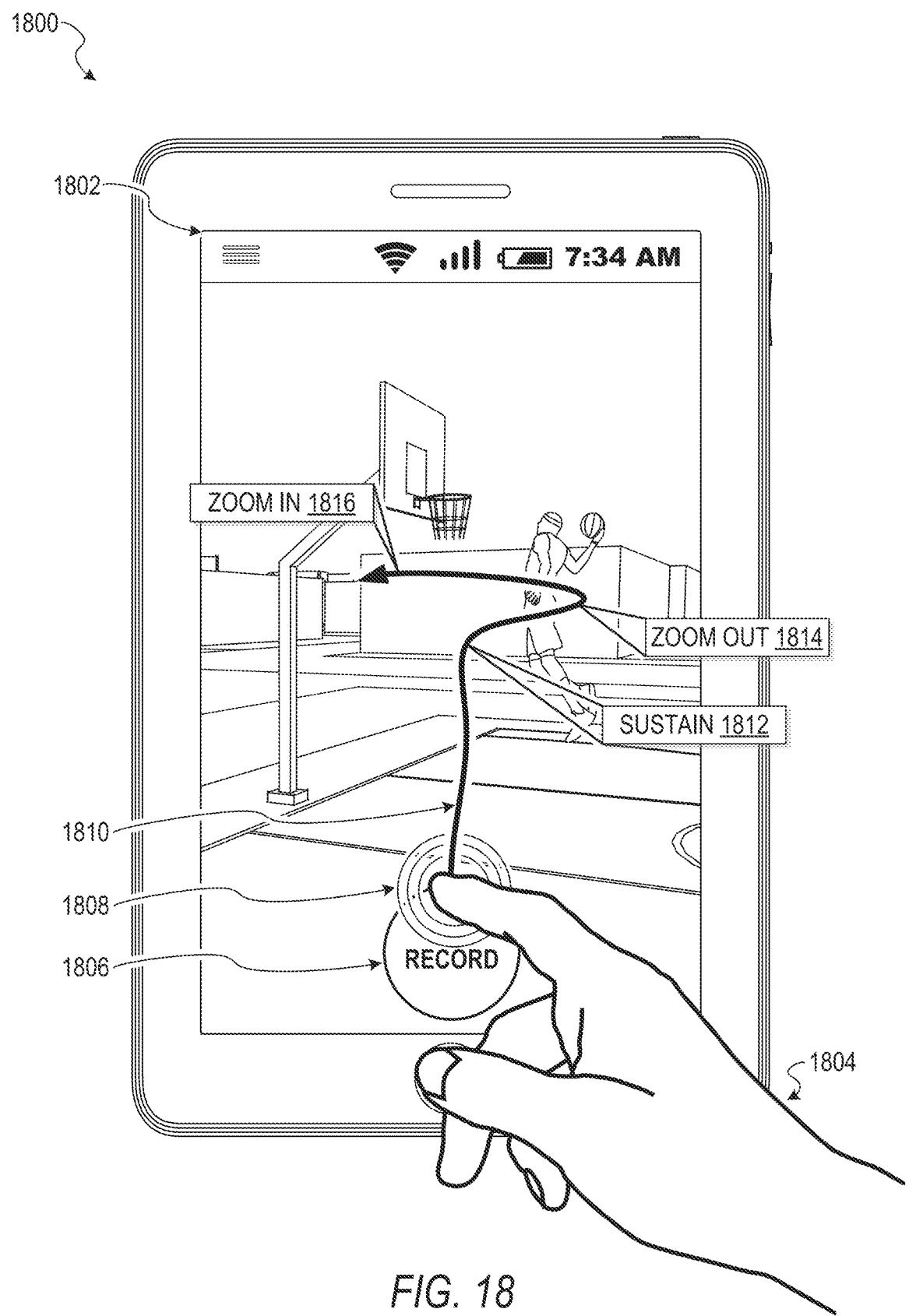
FIG. 18 is a user interface diagram depicting an example of initiating a sustained recording session with a gesture, according to some example embodiments.

FIG. 18 is a user interface diagram 1800 depicting an example of initiating a sustained recording session with a gesture 1810. In the diagram 1800, a user 1804 performs a gesture 1810 with a physical touch 1808 of a touchscreen 1802. In an example embodiment, the gesture navigation system 160 detects various combinations of gestures of the user 1804 to initiate a recording session and adjust parameters of the recording session. For example, the user 1804 touching and holding a user interface element 1806 initiates the recording session while the user 1804 holds down on the user interface element 1806. The user 1804 terminates the recording session by ending the hold (e.g., lifting the user's 1804 finger from the touchscreen 1802). In some embodiments, the user 1804 'locks' the recording session (a sustained recording session that does not terminate by lifting the user's 1804 finger from the touchscreen 1802) by performing an upward slide gesture, such as the gesture 1810, on the touchscreen 1802 after initiating the recording session. For instance, if the gesture module 230 detects the user 1804 performing a slide gesture with a slide distance greater than a particular threshold (an example threshold is indicated by point 1812 of FIG. 18) then the action module 240 selects an action to initiate the sustained recording session and the invocation module 250 initiates the sustained recording session.

In still further embodiments, the user 1804 adjusts, alters, or otherwise modifies parameters or settings of the recording session, such as a zoom level, by performing a slide gesture along an axis (e.g., a horizontal slide, a vertical slide, or a slide along another axis) subsequent to initiating the sustained recording session. For instance, the user 1804 sliding to point 1814 zooms out while the user 1804 sliding to point 1816 zooms in. In a specific example, the user 1804 performs a hold gesture of the user interface element 1806 to initiate the recording session, performs an upward slide gesture to initiate the sustained recording session, and then performs a horizontal slide gesture to zoom in or zoom out.

Figure 19:
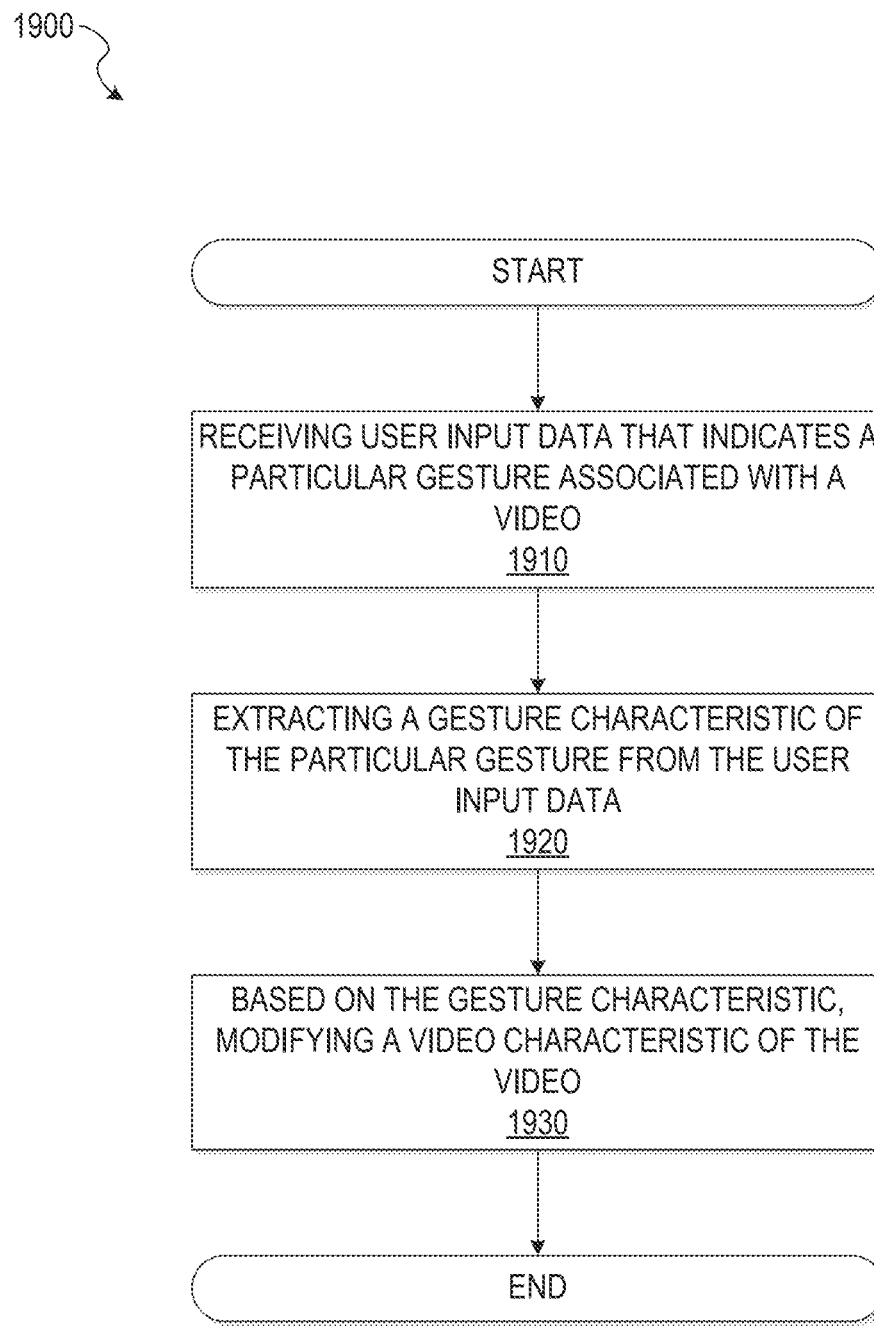
FIG. 19 is a flow diagram illustrating an example method for adjusting, altering, or otherwise modifying parameters, characteristics, or settings of a recording session, a live streaming session, or a media presentation session via a gesture, according to some example embodiments.

FIG. 19 is a flow diagram 1900 illustrating an example method for adjusting, altering, or otherwise modifying parameters, characteristics, or settings of the recording session, the live streaming session, or a media presentation session via a particular gesture. The operations of method 1900 are performed by components of the gesture navigation system 160, and are so described below for the purposes of illustration.

At operation 1910, similar to operation 410 and operation 1510 described above, the sensor module 260 receives user input data that indicates a continuous physical user interaction or gesture associated with a display screen of the user device. For example, the sensor module 260 detects the user performing a particular gesture comprising a physically touch, or multiple physical touches, on the touchscreen of the user device.

At operation 1920, the gesture module 230 extracts a gesture characteristic of the particular gesture from the user input data. For example, the gesture module 230 determines an axis distance of the particular gesture such as a distance between an initial point of the gesture and a current point of the gesture along a particular axis (e.g., a horizontal distance, a vertical distance, or a distance along another axis).

At operation 1930, the action module 240 determines an action based on the gesture characteristic and the invocation module 250 invokes the action. For example, the action can comprise modifying a video characteristic or attribute of a video such as a zoom level, video quality level, camera focus, camera exposure setting, flash settings, switching between available cameras, and so forth. In a specific example, the action module 240 determines a zoom level according to the axis distance. For instance, the action module 240 determines that the action comprises an increase in zoom level corresponding to an increase in the axis distance and a decrease in zoom level corresponding to a decrease in the axis distance.

Figure 20:
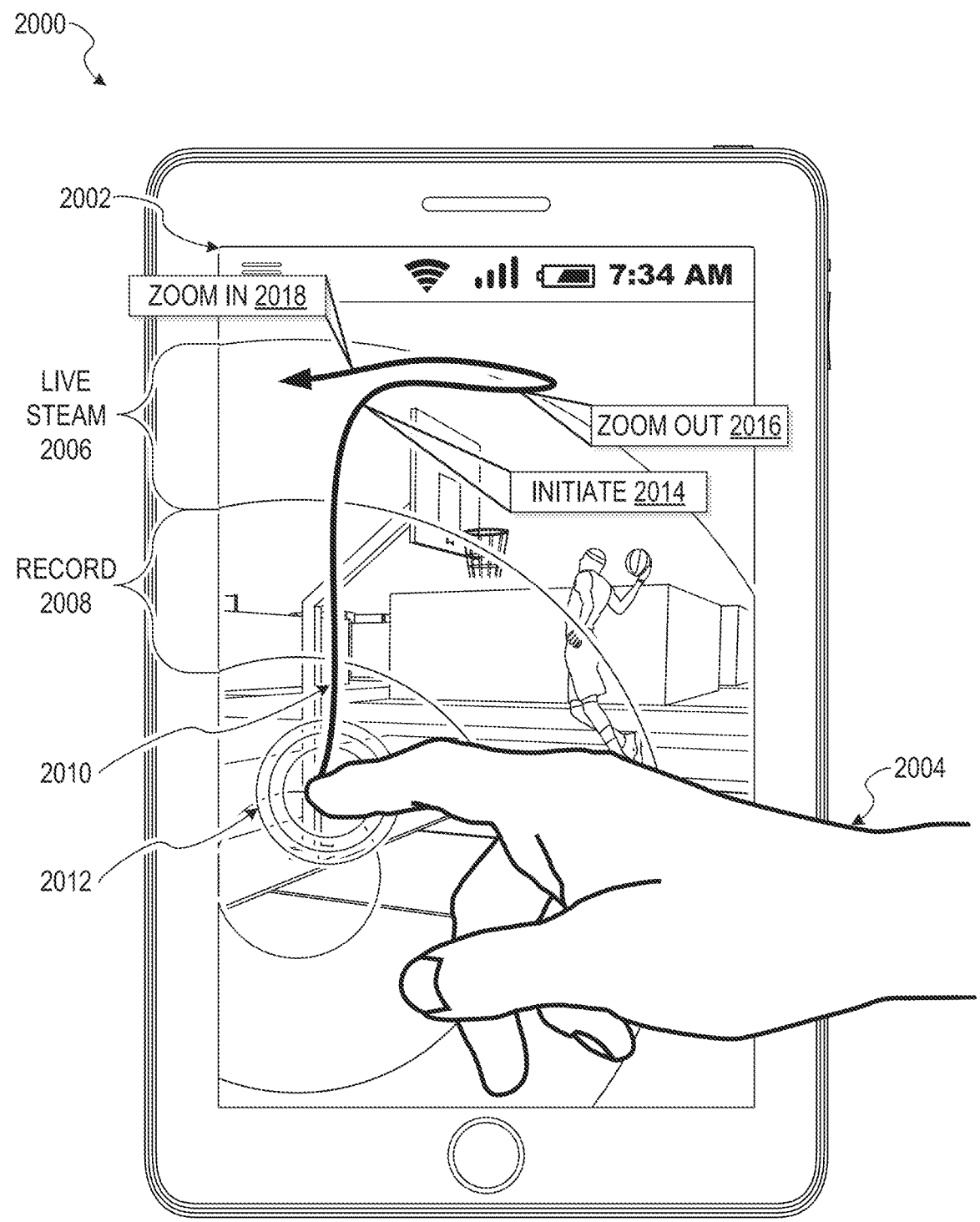
FIG. 20 is a user interface diagram depicting an example of initiating the live streaming session and modifying a characteristic of the live streaming session via a particular gesture, according to some example embodiments.

FIG. 20 is a user interface diagram 2000 depicting an example of initiating the live streaming session and modifying a characteristic of the live streaming session via a particular gesture. In the diagram 2000, a user 2004 initiates a live streaming session by performing a gesture 2010 comprising a physical touch 2012 on a touchscreen 2002. For example, the user 2004 may perform the gesture 2010, such as the radial slide gesture describe above, to select an option to initiate a recording session 2008 or a live streaming session 2006. In this example, the user 2004 selects the option to initiate a live streaming session 2006 by terminating the gesture 2010 at the point 2014 (e.g., the user 2004 lifting their finger from the touchscreen 2002 at the point 2014 or holding at the point 2014 for a threshold period of time). Subsequently, the user 2004 can perform a slide gesture in succession to the radial slide gesture to adjust a zoom level of the video for the live stream. For instance, the user 2004 sliding across the touchscreen 2002 towards the point 2016 zooms out and sliding towards point 2018 zooms in. In this way, the gesture navigation system 160 detects multiple gestures allowing the user 2004 to adjust various settings of the live streaming session.

Figure 21:
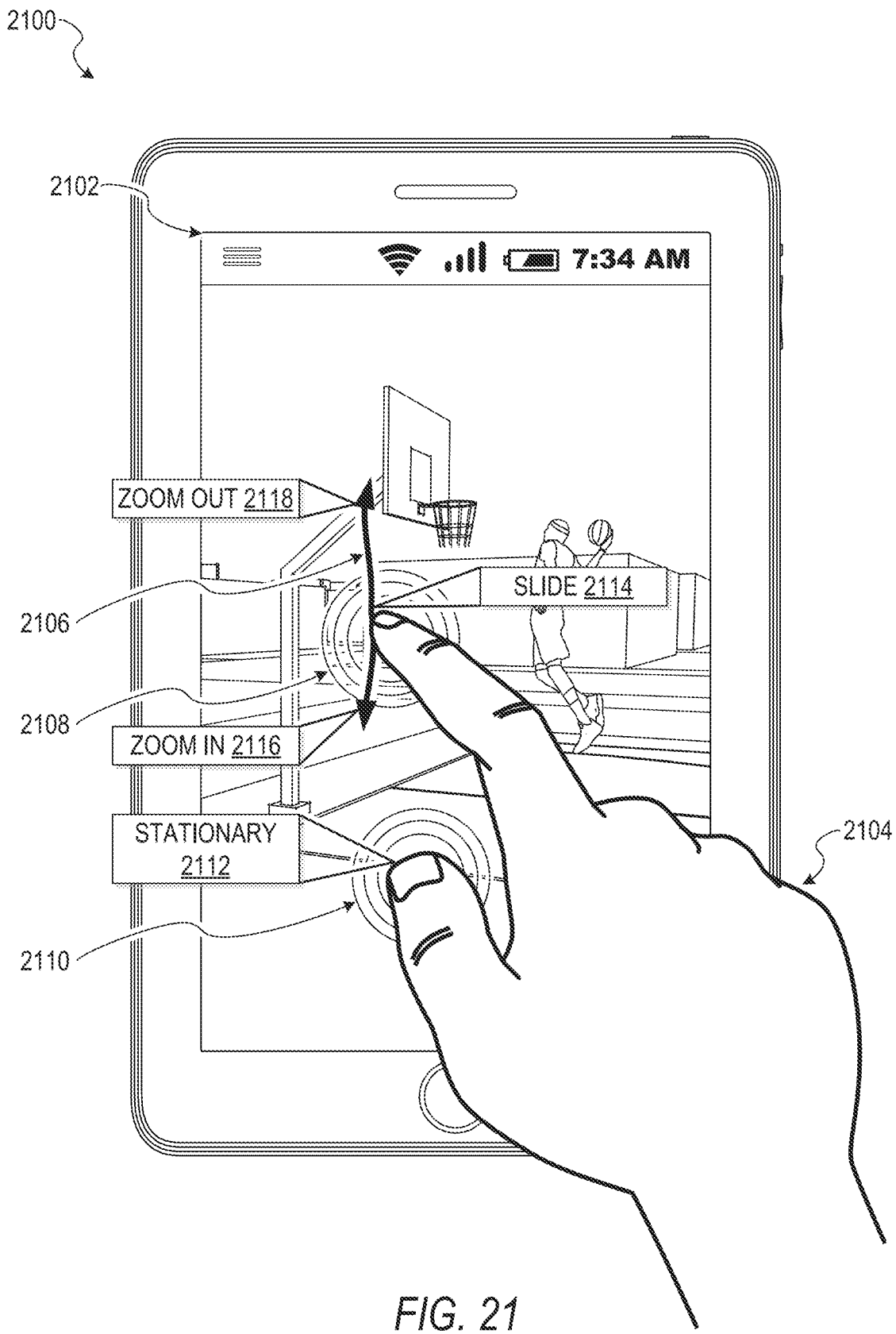
FIG. 21 is a user interface diagram depicting a further example of adjusting, altering, or otherwise modifying parameters, characteristics, or settings of a recording session, a live streaming session, or a media presentation session via a particular gesture, according to some example embodiments.

FIG. 21 is a user interface diagram 2100 depicting a further example of adjusting, altering, or otherwise modifying parameters, characteristics, or settings of the recording session, the live streaming session, or a media presentation session via a particular gesture. In the diagram 2100, a user 2104 is performing a particular gesture comprising physical touch 2110 and physical touch 2108. The user 2104 performs a hold gesture with the physical touch 2110 by substantially refraining from moving the physical touch 2110 from point 2112. While the user 2104 is performing the hold gesture with the physical touch 2110, the user 2104 performs a vertical slide gesture, or a slide gesture along another axis, by moving the physical touch 2108 vertically. In an example embodiment, sliding the physical touch 2108 towards point 2118 zooms out while sliding the physical touch 2108 towards point 2116 zooms in. The purpose of using the hold gesture in conjunction with the vertical slide gesture is to help prevent undesired user interaction (e.g., an accidental touch of the touchscreen by the user 2104). Although, in alternative example embodiments, the user 2104 performs the slide gesture to effectuate zooming, or another type of adjustment, without performing the hold gesture with the physical touch 2110. In these embodiments, the user 2104 effectuates zooming of the video using a single finger.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-21 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like, while yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 22:
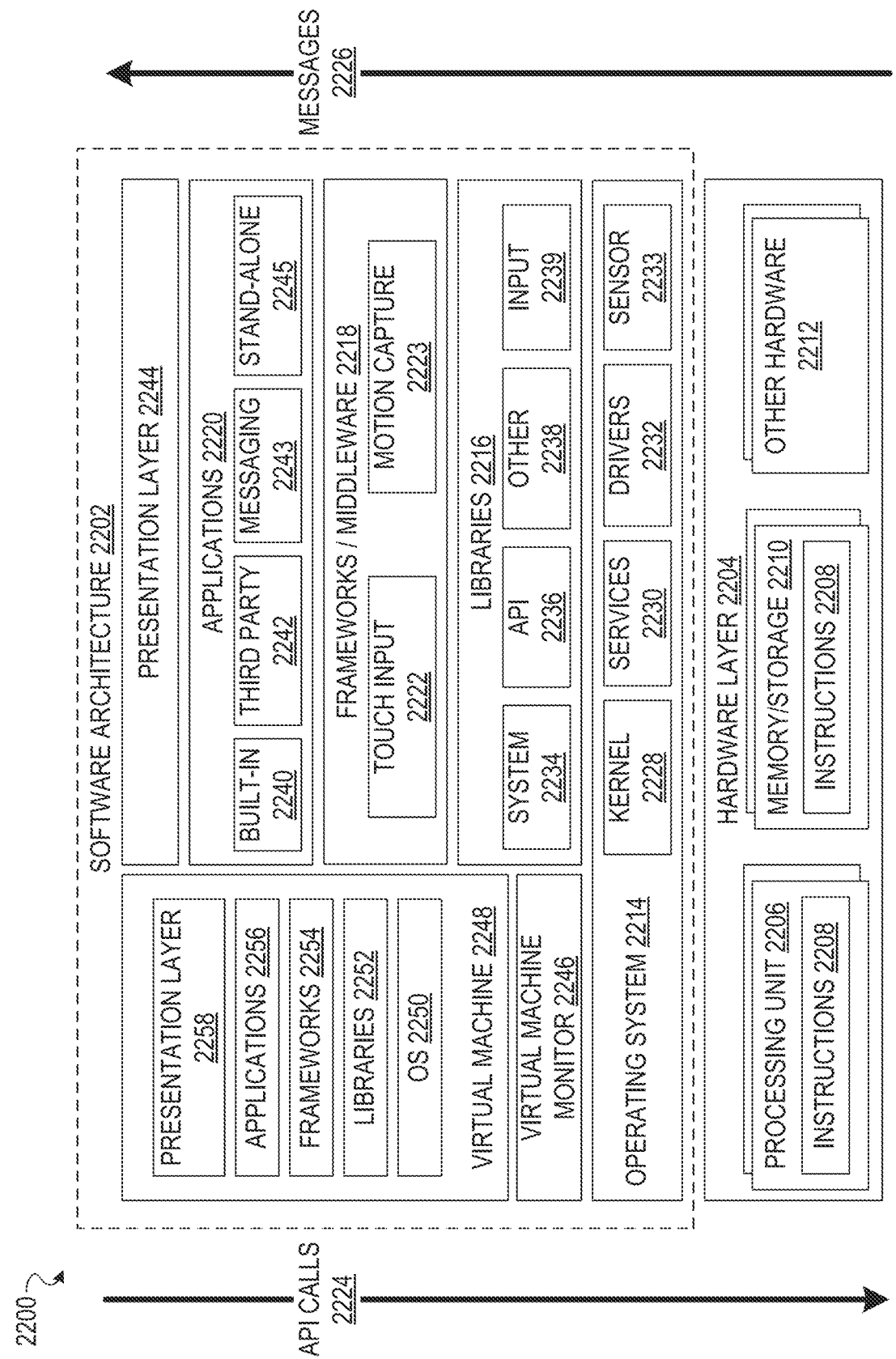
FIG. 22 is a block diagram illustrating an example of a software architecture that may be installed on a machine, according to some example embodiments.

FIG. 22 is a block diagram 2200 illustrating a representative software architecture 2202, which may be used in conjunction with various hardware architectures herein described. FIG. 22 is merely a non-limiting example of a software architecture and it will be appreciated that many other architectures may be implemented to facilitate the functionality described herein. The software architecture 2202 may be executing on hardware such as machine 2300 of FIG. 23 that includes, among other things, processors 2310, memory/storage 2330, and I/O components 2350. A representative hardware layer 2204 is illustrated and can represent, for example, the machine 2300 of FIG. 23. The representative hardware layer 2204 comprises one or more processing units 2206 having associated executable instructions 2208. Executable instructions 2208 represent the executable instructions of the software architecture 2202, including implementation of the methods, modules and so forth of FIGS. 1-21. Hardware layer 2204 also includes memory and storage modules 2210, which also have executable instructions 2208. Hardware layer 2204 may also comprise other hardware 2212 which represents any other hardware of the hardware layer 2204, such as the other hardware illustrated as part of machine 2300.

In the example architecture of FIG. 22, the software architecture 2202 may be conceptualized as a stack of layers where each layer provides particular functionality. For example, the software architecture 2202 may include layers such as an operating system 2214, libraries 2216, frameworks/middleware 2218, applications 2220 and presentation layer 2244. Operationally, the applications 2220 or other components within the layers may invoke application programming interface (API) calls 2224 through the software stack and receive a response, returned values, and so forth illustrated as messages 2226 in response to the API calls 2224. The layers illustrated are representative in nature and not all software architectures have all layers. For example, some mobile or special purpose operating systems may not provide the frameworks/middleware 2218, while others may provide such a layer. Other software architectures may include additional or different layers.

The operating system 2214 may manage hardware resources and provide common services. The operating system 2214 may include, for example, a kernel 2228, services 2230, and drivers 2232. The kernel 2228 may act as an abstraction layer between the hardware and the other software layers. For example, the kernel 2228 may be responsible for memory management, processor management (e.g., scheduling), component management, networking, security settings, and so on. The services 2230 may provide other common services for the other software layers. The drivers 2232 may be responsible for controlling or interfacing with the underlying hardware. For instance, the drivers 2232 may include display drivers, camera drivers, BLUETOOTH® drivers, flash memory drivers, serial communication drivers (e.g., Universal Serial Bus (USB) drivers), WI-FI® drivers, audio drivers, power management drivers, and so forth depending on the hardware configuration. In an example embodiment, the operating system 2214 includes sensor service 2233 that can provide various sensor processing services such as low-level access to touchscreen input data or other user sensor data.

The libraries 2216 may provide a common infrastructure that may be utilized by the applications 2220 or other components or layers. The libraries 2216 typically provide functionality that allows other software modules to perform tasks in an easier fashion than to interface directly with the underlying operating system 2214 functionality (e.g., kernel 2228, services 2230 or drivers 2232). The libraries 2216 may include system libraries 2234 (e.g., C standard library) that may provide functions such as memory allocation functions, string manipulation functions, mathematic functions, and the like. In addition, the libraries 2216 may include API libraries 2236 such as media libraries (e.g., libraries to support presentation and manipulation of various media format such as MPREG4, H.264, MP3, AAC, AMR, JPG, or PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2216 may also include a wide variety of other libraries 2238 to provide many other APIs to the applications 2220 and other software components/modules. In an example embodiment, the libraries 2216 include input libraries 2239 that provide input tracking, capture, or otherwise monitor user input such as touchscreen input that can be utilized by the gesture navigation system 160.

The frameworks/middleware 2218 (also sometimes referred to as middleware) may provide a higher-level common infrastructure that may be utilized by the applications 2220 or other software components/modules. For example, the frameworks/middleware 2218 may provide various graphic user interface (GUI) functions, high-level resource management, high-level location services, and so forth. The frameworks/middleware 2218 may provide a broad spectrum of other APIs that may be utilized by the applications 2220 or other software components/modules, some of which may be specific to a particular operating system or platform. In an example embodiment, the frameworks/middleware 2218 include an image touch input framework 2222 and a motion capture framework 2223. The touch input framework 2222 can provide high-level support for touch input functions that can be used in aspects of the gesture navigation system 160. Similarly, the motion capture framework 2223 can provide high-level support for motion capture and other input user input detection.

The applications 2220 include built-in applications 2240 or third party applications 2242. Examples of representative built-in applications 2240 may include, but are not limited to, a contacts application, a browser application, a book reader application, a location application, a media application, a messaging application, or a game application. Third party applications 2242 may include any of the built-in applications 2240 as well as a broad assortment of other applications. In a specific example, the third party application 2242 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 2242 may invoke the API calls 2224 provided by the mobile operating system such as operating system 2214 to facilitate functionality described herein. In an example embodiment, the applications 2220 include a messaging application 2243 that includes the gesture navigation system 160 as part of the messaging application 2243. In another example embodiment, the applications 2220 include a stand-alone application 2245 that includes the gesture navigation system 160.

The applications 2220 may utilize built-in operating system functions (e.g., kernel 2228, services 2230 or drivers 2232), libraries (e.g., system libraries 2234, API libraries 2236, and other libraries 2238), frameworks/middleware 2218 to create user interfaces to interact with users of the system. Alternatively, or additionally, in some systems interactions with a user may occur through a presentation layer, such as presentation layer 2244. In these systems, the application/module "logic" can be separated from the aspects of the application/module that interact with a user.

Some software architectures utilize virtual machines. In the example of FIG. 22, this is illustrated by virtual machine 2248. A virtual machine creates a software environment where applications/modules can execute as if they were executing on a hardware machine (such as the machine 2300 of FIG. 23, for example). The virtual machine 2248 is hosted by a host operating system (operating system 2214 in FIG. 23) and typically, although not always, has a virtual machine monitor 2246, which manages the operation of the virtual machine 2248 as well as the interface with the host operating system (i.e., operating system 2214). A software architecture executes within the virtual machine 2248 such as an operating system 2250, libraries 2252, frameworks/middleware 2254, applications 2256 or presentation layer 2258. These layers of software architecture executing within the virtual machine 2248 can be the same as corresponding layers previously described or may be different.

Figure 23:
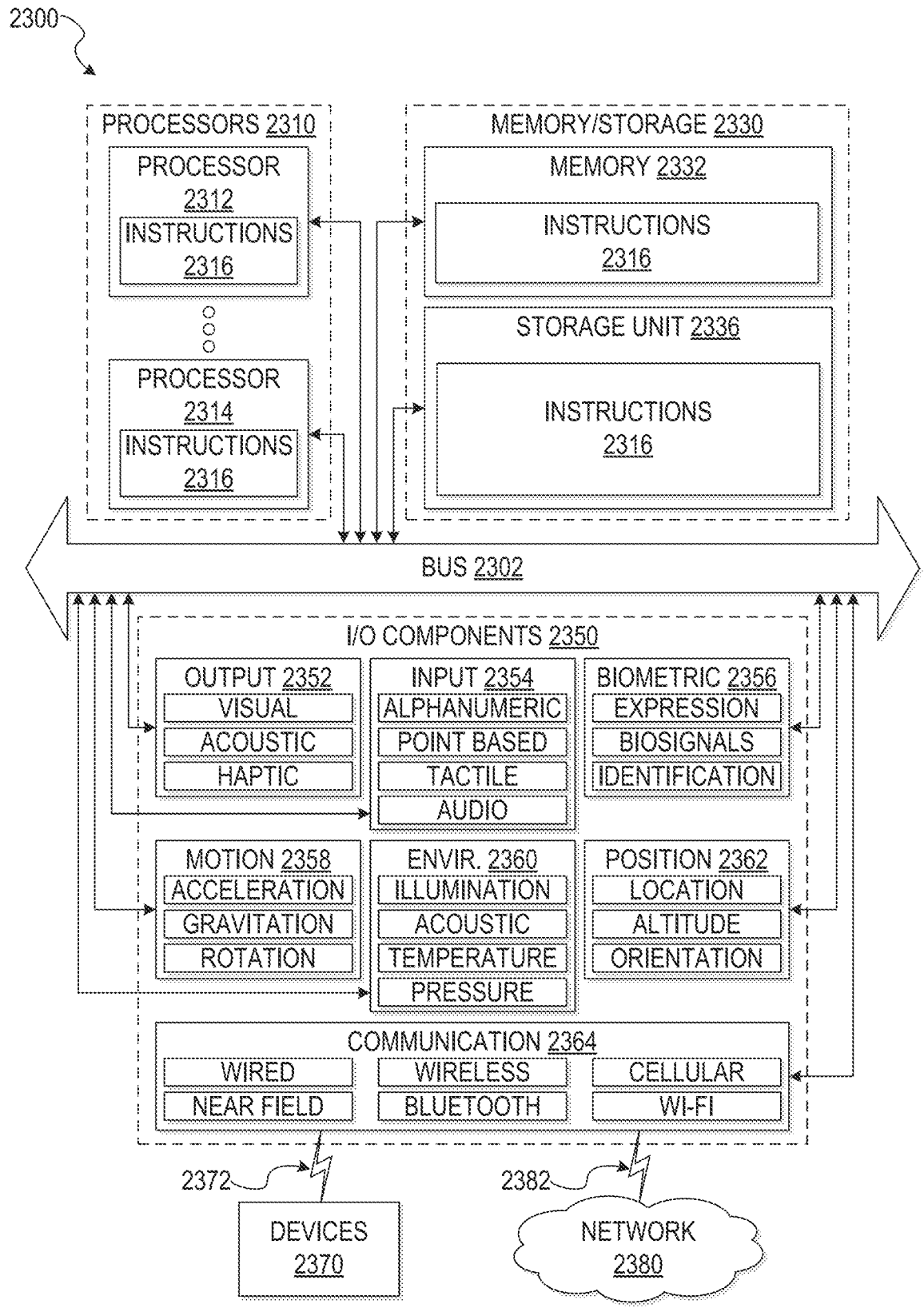
FIG. 23 is a block diagram presenting a diagrammatic representation of a machine in the form of a computer system within which a set of instructions may be executed for causing the machine to perform any of the methodologies discussed herein, according to an example embodiment.

FIG. 23 is a block diagram illustrating components of a machine 2300, according to some example embodiments, able to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an applet, an app, or other executable code) for causing the machine 2300 to perform any one or more of the methodologies discussed herein can be executed. For example, the instructions 2316 can cause the machine 2300 to execute the flow diagrams of FIGS. 4, 8, 10, 15, and 19. Additionally, or alternatively, the instructions 2316 can implement the communication module 210, the user interface module 220, the gesture module 230, the action module 240, the invocation module 250, or the sensor module 260 of FIG. 2, and so forth. The instructions 2316 transform the general, non-programmed machine into a particular machine programmed to carry out the described and illustrated functions in the manner described. In alternative embodiments, the machine 2300 operates as a standalone device or can be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2316, sequentially or otherwise, that specify actions to be taken by the machine 2300. Further, while only a single machine 2300 is illustrated, the term "machine" shall also be taken to include a collection of machines 2300 that individually or jointly execute the instructions 2316 to perform any one or more of the methodologies discussed herein.

The machine 2300 can include processors 2310, memory/storage 2330, and I/O components 2350, which can be configured to communicate with each other such as via a bus 2302. In an example embodiment, the processors 2310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 2312 and processor 2314 that may execute instructions 2316. The term "processor" is intended to include multi-core processor that may comprise two or more independent processors (sometimes referred to as "cores") that can execute instructions contemporaneously. Although FIG. 23 shows multiple processors 2310, the machine 2300 may include a single processor with a single core, a single processor with multiple cores (e.g., a multi-core processor), multiple processors with a single core, multiple processors with multiples cores, or any combination thereof.

The memory/storage 2330 can include a memory 2332, such as a main memory, or other memory storage, and a storage unit 2336, both accessible to the processors 2310 such as via the bus 2302. The storage unit 2336 and memory 2332 store the instructions 2316 embodying any one or more of the methodologies or functions described herein. The instructions 2316 can also reside, completely or partially, within the memory 2332, within the storage unit 2336, within at least one of the processors 2310 (e.g., within the processor's cache memory), or any suitable combination thereof, during execution thereof by the machine 2300. Accordingly, the memory 2332, the storage unit 2336, and the memory of the processors 2310 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 2316. The term "machine-readable medium" shall also be taken to include any medium, or combination of multiple media, that is capable of storing instructions (e.g., instructions 2316) for execution by a machine (e.g., machine 2300), such that the instructions, when executed by one or more processors of the machine 2300 (e.g., processors 2310), cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2350 can include a wide variety of components to receive input, provide output, produce output, transmit information, exchange information, capture measurements, and so on. The specific I/O components 2350 that are included in a particular machine will depend on the type of machine. For example, portable machines such as mobile phones will likely include a touch input device or other such input mechanisms, while a headless server machine will likely not include such a touch input device. It will be appreciated that the I/O components 2350 can include many other components that are not shown in FIG. 23. The I/O components 2350 are grouped according to functionality merely for simplifying the following discussion, and the grouping is in no way limiting. In various example embodiments, the I/O components 2350 can include output components 2352 and input components 2354. The output components 2352 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2354 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 2350 can include biometric components 2356, motion components 2358, environmental components 2360, or position components 2362 among a wide array of other components. For example, the biometric components 2356 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 can include acceleration sensor components (e.g., an accelerometer), gravitation sensor components, rotation sensor components (e.g., a gyroscope), and so forth. The environmental components 2360 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2362 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2350 may include communication components 2364 operable to couple the machine 2300 to a network 2380 or devices 2370 via a coupling 2382 and a coupling 2372, respectively. For example, the communication components 2364 include a network interface component or other suitable device to interface with the network 2380. In further examples, communication components 2364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2370 may be another machine or any of a wide variety of peripheral devices (e.g., a peripheral device coupled via a Universal Serial Bus (USB)).

Moreover, the communication components 2364 can detect identifiers or include components operable to detect identifiers. For example, the communication components 2364 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 2380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2380 or a portion of the network 2380 may include a wireless or cellular network, and the coupling 2382 may be a Code Division Multiple Access (CDMA) connection, a Global System for Mobile communications (GSM) connection, or other type of cellular or wireless coupling. In this example, the coupling 2382 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2316 can be transmitted or received over the network 2380 using a transmission medium via a network interface device (e.g., a network interface component included in the communication components 2364) and utilizing any one of a number of well-known transfer protocols (e.g., Hypertext Transfer Protocol (HTTP)). Similarly, the instructions 2316 can be transmitted or received using a transmission medium via the coupling 2372 (e.g., a peer-to-peer coupling) to devices 2370. The term "transmission medium" shall be taken to include any intangible medium that is capable of storing, encoding, or carrying the instructions 2316 for execution by the machine 2300, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more hardware processors, configured to perform operations comprising:
   receiving user input data comprising a series of points in time corresponding to physical user input, the user input data comprising temporal data representing a timestamp for each point in the series of points;
   determining, based on the user input data, that a first collection of points in the series of points is associated with a distance that changes at a steady rate with time, the first collection of points corresponding to a radial slide gesture;
   determining that a second point in the series of points represents a hold gesture that follows the radial slide gesture based on a duration of time associated with the second point corresponding to a hold time threshold;
   activating a radial slide mode and causing presentation of a visual indication of the radial slide gesture to indicate that the radial slide mode is active in response to determining that the second point represents the hold gesture; and
   in response to determining that the second point represents the hold gesture that follows the radial slide gesture, selecting an action from a plurality of actions based on the distance associated with the radial slide gesture.

2. The system of claim 1, wherein the operations further comprise generating a graph of distance versus time based on the user input data, wherein the visual indication comprises a change in background color of a user interface.

3. The system of claim 1, wherein the operations further comprise:
   capturing live media data from a camera sensor;
   displaying the live media data on a touchscreen;
   detecting a first gesture on the touchscreen while displaying the live media data, the first gesture corresponding to a first plurality of continuous touch positions along a first direction;
   sending a live stream of the live media data to other user devices in response to a first distance of the first plurality of continuous touch positions along the first direction performed by the first gesture exceeding a threshold.

4. The system of claim 3, wherein the operations further comprise:
   detecting, while sending the live stream of the live media data to the other user devices, a second gesture on the touchscreen having a second distance, the second gesture corresponding to a second plurality of continuous touch positions along a second direction, the second direction corresponding to a different axis than the first direction; and
   adjusting a zoom level of the live stream based on the second distance of the second gesture, the zoom level being adjusted by the second plurality of continuous touch positions along the second direction after the live stream is initiated by the first plurality of continuous touch positions along the first direction.

5. The system of claim 1, wherein the selection of the action is independent of an angle of a line formed by the first collection of points and a reference line on a touchscreen, and wherein the visual indication comprises a textual description indicating successful completion of the hold gesture.

6. The system of claim 1, wherein the operations further comprise:
   determining that a finger of a user has been lifted from a touchscreen; and
   causing presentation of a user interface displaying a visual indication of the selected action.

7. The system of claim 1, wherein the operations further comprise:
   receiving an indication of a designated user interface element, wherein each of multiple actions is associated with the designated user interface element.

8. The system of claim 7, wherein the operations further comprise:
  determining the designated user interface element based on a first gesture.

9. The system of claim 8, wherein the designated user interface element is not obscured by a visual indication associated with the selected action of the multiple actions.

10. The system of claim 1, wherein the operations further comprise:
  causing presentation of a visual indication on a user interface that the selected action cannot be performed.

11. The system of claim 1, wherein the operations further comprise switching between a recording session and a live stream based on a distance associated with the first collection of points.

12. The system of claim 11, wherein the operations further comprise causing live media data of the live stream to be recorded during the recording session in response to determining that the first collection of points ended within a first distance of initial contact with a touchscreen, and activating the live stream in response to determining that the first collection of points ended within a second distance of the initial contact with the touchscreen.

13. The system of claim 1, wherein the operations further comprise:
  causing display of a user interface element corresponding to activation of a live stream; and
  modifying a display attribute of the user interface element based on a distance between a current position associated with a first gesture and a position of the user interface element on a touchscreen.

14. The system of claim 1, wherein the operations further comprise causing presentation of information associated with a live stream, the information comprising connectivity information and an indication that the connectivity information allows the live stream to be sent to other user devices.

15. A non-transitory machine-readable medium storing instructions that, when executed by at least one hardware processor, configure the at least one hardware processor to perform operations comprising:
  receiving user input data comprising a series of points in time corresponding to physical user input, the user input data comprising temporal data representing a timestamp for each point in the series of points;
  determining, based on the user input data, that a first collection of points in the series of points is associated with a distance that changes at a steady rate with time, the first collection of points corresponding to a radial slide gesture;
  determining that a second point in the series of points represents a hold gesture that follows the radial slide gesture based on a duration of time associated with the second point corresponding to a hold time threshold;
  activating a radial slide mode and causing presentation of a visual indication of the radial slide gesture to indicate that the radial slide mode is active in response to determining that the second point represents the hold gesture; and
  in response to determining that the second point represents the hold gesture that follows the radial slide gesture, selecting an action from a plurality of actions based on the distance associated with the radial slide gesture.

16. The non-transitory machine-readable medium of claim 15, wherein the operations further comprise adjusting a zoom level of a live stream based on a second distance of a second gesture, the zoom level being adjusted by a second plurality of continuous touch positions along a second direction after the live stream is initiated by a first plurality of continuous touch positions along a first direction.

17. The non-transitory machine-readable medium of claim 15, wherein the operations further comprise:
  capturing live media data from a camera sensor;
  displaying the live media data on a touchscreen;
  detecting a first gesture on the touchscreen while displaying the live media data, the first gesture corresponding to a first plurality of continuous touch positions along a first direction;
  sending a live stream of the live media data to other user devices in response to a first distance of the first plurality of continuous touch positions along the first direction performed by the first gesture exceeding a threshold.

18. The non-transitory machine-readable medium of claim 17, wherein the operations further comprise:
  detecting, while sending the live stream of the live media data to the other user devices, a second gesture on the touchscreen having a second distance, the second gesture corresponding to a second plurality of continuous touch positions along a second direction, the second direction corresponding to a different axis than the first direction; and
  adjusting a zoom level of the live stream based on the second distance of the second gesture, the zoom level being adjusted by the second plurality of continuous touch positions along the second direction after the live stream is initiated by the first plurality of continuous touch positions along the first direction.

19. The non-transitory machine-readable medium of claim 15, wherein the selection of the action is independent of an angle of a line formed by the first collection of points and a reference line of a touchscreen.

20. A method comprising:
  receiving user input data comprising a series of points in time corresponding to physical user input, the user input data comprising temporal data representing a timestamp for each point in the series of points;
  determining, based on the user input data, that a first collection of points in the series of points is associated with a distance that changes at a steady rate with time, the first collection of points corresponding to a radial slide gesture;
  determining that a second point in the series of points represents a hold gesture that follows the radial slide gesture based on a duration of time associated with the second point corresponding to a hold time threshold;
  activating a radial slide mode and causing presentation of a visual indication of the radial slide gesture to indicate that the radial slide mode is active in response to determining that the second point represents the hold gesture; and
  in response to determining that the second point represents the hold gesture that follows the radial slide gesture, selecting an action from a plurality of actions based on the distance associated with the radial slide gesture.

* * * * *